(12) United States Patent  (10) Patent No.: US 8,039,823 B2
Iizuka et al. (45) Date of Patent: Oct. 18, 2011

(54) MATERIAL ACTIVATING DEVICE

(75) Inventors: Yukio Iizuka, Tokyo-To (JP); Makoto Tanaka, Tokyo-To (JP)

(73) Assignee: W.F.N. Co., Ltd, Tokyo-To (JP)

( * ) Notice: Subject to any disclaimer, the term of this patent is extended or adjusted under 35 U.S.C. 154(b) by 208 days.

(21) Appl. No.: 12/566,753

(22) Filed: Sep. 25, 2009

(65) Prior Publication Data

US 2010/0038561 A1 Feb. 18, 2010

Related U.S. Application Data

(62) Division of application No. 10/583,009, filed as application No. PCT/JP2005/000611 on Jan. 19, 2005, now Pat. No. 7,612,352.

(51) Int. Cl.
*G21K 5/02* (2006.01)
*G21H 5/00* (2006.01)
*F02M 27/00* (2006.01)

(52) U.S. Cl. ............... 250/496.1; 123/539; 123/573

(58) Field of Classification Search ............. 250/496.1, 250/497.1, 493.1; 123/536, 539, 573; 252/644
See application file for complete search history.

(56) References Cited

U.S. PATENT DOCUMENTS

| | | |
|---|---|---|
| 1,839,270 A | 1/1932 | Senftner |
| 2,269,027 A | 1/1942 | Klinghoffer |
| 2,269,458 A | 1/1942 | Kahn |
| 3,161,504 A | 12/1964 | Black et al. |
| 4,891,165 A | 1/1990 | Suthanthiran |
| 6,653,646 B1 | 11/2003 | Shibata |
| 7,612,352 B2 * | 11/2009 | Iizuka et al. ............... 250/496.1 |
| 7,632,291 B2 * | 12/2009 | Stephens et al. ............ 606/195 |
| 2004/0238802 A1 | 12/2004 | Onoue |

FOREIGN PATENT DOCUMENTS

| | | |
|---|---|---|
| GB | 1 148 549 | 4/1969 |
| JP | 61-293463 | 12/1986 |
| JP | 3-500819 | 2/1991 |
| JP | 8-218955 | 8/1996 |
| JP | 10-110655 | 4/1998 |
| JP | 10-180921 | 7/1998 |
| JP | 11-10763 | 1/1999 |
| JP | 2000-98090 | 4/2000 |
| JP | 3065590 | 5/2000 |
| JP | 2001-3067 | 1/2001 |

(Continued)

OTHER PUBLICATIONS

Patent Abstracts of Japan of JP 2003-343366 dated Dec. 3, 2003.

(Continued)

*Primary Examiner* — Jack Berman
(74) *Attorney, Agent, or Firm* — Ladas & Parry LLP

(57) ABSTRACT

There is provided a material activating device capable of being formed in any one of various shapes and having an improved material activating effect.

A material activating device formed by superposing a plurality of polymer film 31 each having one surface coated with a metal film 32, and radioactive layer 33 of a radioactive means has a very small thickness and is very flexible. The metal films 32 are insulated from each other by the electrically insulating polymer films 31 and are spaced from each other by a distance corresponding to the thickness of the polymer films 31. Consequently, the material activating effect of the radioactive rays emitted by the radioactive layer 33 of the radioactive means is enhanced.

4 Claims, 22 Drawing Sheets

FOREIGN PATENT DOCUMENTS

| | | |
|---|---|---|
| JP | 2001-216999 | 8/2001 |
| JP | 2001-254031 | 9/2001 |
| JP | 2002-54514 | 2/2002 |
| JP | 2003-343366 | 12/2003 |
| WO | 90/01208 | 2/1990 |

OTHER PUBLICATIONS

Patent Abstracts of Japan of JP 8-218955 dated Aug. 27, 1996.
Patent Abstracts of Japan of JP 11-10763 dated Jan. 19, 1999.
Patent Abstracts of JP 61-293463 dated Dec. 23, 1986.
Patent Abstracts of Japan of JP 2002-54514 dated Feb. 20, 2002.
Patent Abstracts of Japan of JP 2000-98090 dated Apr. 7, 2000.
Patent Abstracts of Japan of JP 10-110655 dated Apr. 28, 1998.
Patent Abstracts of Japan of JP 2001-216999 dated Aug. 10, 2001.
Patent Abstract of Japan of JP 2001-254031 dated Sep. 18, 2001.
Patent Abstract of Japan of JP 10-180921 dated Jul. 7, 1998.
Patent Abstract of Japan of JP 2001-3067 dated Jan. 9, 2001.

* cited by examiner (a)

(b)

US 8,039,823 B2

MATERIAL ACTIVATING DEVICE

This application is a divisional of application Ser. No. 10/583,009 filed on Jun. 15, 2006 now U.S. Pat. No. 7,612,352, which is a 371 of PCT/JP2005/000611 filed Jan. 19, 2005, claims the benefit thereof and incorporates the same by reference.

TECHNICAL FIELD

The present invention relates to a material activating device and, more specifically, to a material activating device provided with a conductive metal layer interposed between a material to be activated and a radioactive means for emitting radioactive rays for irradiating the material to activate the material efficiently.

BACKGROUND ART

The applicant of the present patent application developed material activating devices each provided with a conductive metal layer interposed between a material to be activated and a radioactive means for emitting radioactive rays for irradiating the material and capable of efficiently activating the material. Patent has been granted to those material activating devices (refer to Patent documents 1 and 2).

The construction of a material activating device disclosed in Patent document 1 (JP Pat. No. 3065590) will be briefly described with reference to FIGS. 29 and 30. Referring to FIGS. 29 and 30, a material activating device 1 is provided with a radioactive layer 2 formed by forming particles of a mineral, such as monazite, in the shape of a strip.

A conductive metal layer formed by laminating copper plates 3 and 4 is laminated to one of the surfaces of the radioactive layer 2.

A lead plate 5 having the shape of a strip and a copper plate 6 having the shape of a strip for intercepting radioactive rays are superposed on the other surface of the radioactive layer 2.

The radioactive layer 2, the copper plates 3 and 4, the lead plate 5 and the copper plate 6 are joined so as to be slidable relative to each other with a rivet 7. The material activating device 1 can be easily wound around an intake duct D made of a polymeric material for an automotive engine.

When the material activating device 1 is wound around the intake duct D, the two laminated copper plates 3 and 4 form a conductive metal layer on the intake duct D, and the radioactive layer 2 covers the conductive metal layer.

Radioactive rays having a dose equivalent on the order of 100 mSv emitted by the radioactive layer 2 ionize intake air flowing through the intake duct D.

At the same time, the copper plates 3 and 4 are charged with electric charges produce by ionization and create an electric field and a magnetic field. The electric and the magnetic field thus created act on the ionized intake air to promote the ionization of the intake air greatly.

The ionized air supplied into cylinders of an automobile, not shown, mixes satisfactorily with fuel injected into the cylinder. Consequently, combustion efficiency at which the fuel burns in the cylinder is improved significantly, the improvement of fuel consumption rate and the purification of the exhaust gas can be promoted.

The construction of another material activating device mentioned in Patent document 1 (JP Pat. No. 3065590) will be briefly described with reference to FIG. 31. Referring to FIG. 31, a material activating device 10 includes a pair of holding members 11 and 12 and particles 13 of a mineral, such as monazite, sealed in a space defined by the holding members 11 and 12. The material activating device 10 is mounted on and fastened to a wall W of a conductive metal with bolts B.

The effect of weak radioactive rays emitted by the monazite particles 13 is amplified greatly by the holding member 11 and the wall W forming a conductive metal layer. Thus a material, not shown, held inside the wall P can be efficiently activated.

The construction of a material activating device mentioned in Patent document 2 (JP Pat. No. 3573412) will be briefly described with reference to FIG. 32. Referring to FIG. 32, a material activating device 20 is intended to be wound around, for example, a pipe P to activate a material M that flows through the pipe P. The material activating device 20 has a radioactive layer 21 capable of emitting radioactive rays for irradiating the material M.

The radioactive layer 21 is formed by forming monazite particles that emit radioactive rays in a strip.

A first conductive metal layer 22 formed by laminating a plurality of copper sheets having a thickness of 0.1 mm is laminated to one surface of the radioactive layer 21 on the side of the pipe P. A second conductive metal layer 23 formed by laminating two brass or aluminum sheets having a thickness of 0.1 mm is laminated to the other surface of the radioactive layer 21 far from the pipe P.

The degree of activation of the material M is adjusted by differentiating the mass of the metal forming the first conductive metal layer 22 and that of the metal forming the second conductive metal layer 23.

[Patent document 1]
JP Pat. No. 3065590
[Patent document 2]
JP Pat. No. 3573412

DISCLOSURE OF THE INVENTION

Problem to be Solved by the Invention

The applicant of the present invention patent application made R&D activities for the further improvement of the foregoing material activating devices and found that the material forming the conductive metal layer is not limited to metal plates and the same operations and effects can be achieved when the conductive metal layer is formed of other means and developed a new structure capable of achieving the same operations and effects even if the conductive metal plates are not laminated.

It is an object of the present invention to provide a material activating device developed by incorporating improvements into the foregoing two patented material activating devices, capable of being formed in various shapes, of being applied to a wide variety of uses and of exercising a further improved material activating effect.

Means for Solving the Problem

Disclosed herein is a material activating device including a radioactive layer of a radioactive means that emits radioactive rays for irradiating a material to be activated, and a conductive metal layer disposed on one side of the radioactive layer of the radioactive means so as to be interposed between the radioactive layer of the radioactive means and the material to be activated, wherein the conductive metal layer is a metal film formed on a surface of a layered support structure.

The layered support structure is a thin, layered member, such as a polymer film or a paper sheet on which a conductive metal film can be formed by vacuum evaporation, sputtering, electroplating or electroless plating or a thin layered member to which a conductive metal foil, such as an aluminum foil, a gold foil, a silver foil or a copper foil can be pasted.

A plurality of conductive metal layers can be arranged in a parallel arrangement at intervals approximately equal to the thickness of layered support structures each having one surface coated with a conductive metal film by laminating the layered support structures.

When the layered support structures are made of an electrically insulating material, the plurality of conductive metal layers can be electrically isolated from each other.

The material activating device as compared with the foregoing two patented material activating devices, can be formed in a very small thickness and is very flexible. Consequently, the material activating device can be applied to a wide variety of uses in a wide field of application.

Although the conductive metal layers have a thickness on the order of micrometers, the conductive metal layers have a sufficient metal mass in view of balance with the amount of energy of the radioactive rays emitted by the radioactive means.

The material and thickness of the polymer film, the thickness of the conductive metal film formed on the surface of the polymer film and the number of the laminated layered support structures are determined properly taking into consideration the properties of the material to be activated.

In the material activating device a radioactive layer of the radioactive means may be formed by printing on one of the surfaces of the layered support structure opposite a surface on which the metal film is formed or a radioactive layer of the radioactive means may be formed by printing on a surface of the metal film.

The radioactive layer of the radioactive means may be a solid layer or a patterned layer of a coating material prepared by mixing particles of a radioactive mineral and a printing ink formed by, for example, silk-screen printing.

The pattern of the printed radioactive layer of the radioactive means is changed properly. For example, the density of the radioactive layer of the radioactive means per unit area can be optionally changed by changing the width of lines forming a grid pattern and the interval between the lines or by changing the diameter of dots forming a polka-dot pattern and interval between the dots.

A means for solving the foregoing problem is a material activating device including a radioactive layer of a radioactive means that emits radioactive rays for irradiating a material to be activated, and conductive metal layers disposed on one side of the radioactive layer of the radioactive means so as to be interposed between the radioactive layer of the radioactive means and the material to be activated, wherein the conductive metal layers are superposed in layers, and an insulating layer of an electrically insulating material is interposed between the adjacent conductive metal layers.

The single insulating layer of the electrically insulating material may be interposed between the adjacent ones of the plurality of conductive metal layers or each of a plurality of insulating layer of the electrically insulating material may be interposed between the adjacent conductive metal layers.

The material activating device is fundamentally different in construction from the foregoing patented material activating devices in that the conductive metal layers are electrically insulated from each other and therefore, the material activating device has an improved material activating effect.

Although further studies are necessary to explain explicitly reasons that improve the material activating effect, it is inferred that potential difference between the conductive metal layers caused by the electrical insulation of the conductive metal layers from each other improves the material activating effect.

A means for solving the foregoing problem is a material activating device including a radioactive layer of a radioactive means that emits radioactive rays for irradiating a material to be activated, and a conductive metal layer disposed on one side of the radioactive layer of the radioactive means so as to be interposed between the radioactive layer of the radioactive means and the material to be activated, wherein a graphite layer is interposed between the radioactive layer of the radioactive means and the conductive metal layer so as to be in close contact with a surface of the conductive metal layer.

According to another embodiment, another conductive metal layer may be interposed between the radioactive layer of the radioactive means and the graphite layer.

Either of the material activating devices described above is provided with the graphite layer attached closely to the surface of the conductive metal layer to reduce work function on the surface of the conductive metal layer. Consequently, the degree of activation of the material is improved.

Work function is the minimum energy needed to remove an electron from the surface of a conductive metal.

A commercially available graphite sheet may be used for forming the graphite layer or a sheet formed by spreading a mixture prepared by dispersing graphite particles in a polymeric material, such as a coating material or rubber, in a sheet and setting the sheet may be used as the graphite layer.

A means for solving the foregoing problem is a material activating device including a radioactive layer of a radioactive means that emits radioactive rays for irradiating a material to be activated, and a conductive metal layer disposed on one side of the radioactive layer of the radioactive means so as to be interposed between the radioactive layer of the radioactive means and the material to be activated, wherein the conductive metal layer is formed by holding conductive metal particles or fibers by a holding means.

According to one embodiment, the holding means may be a polymer layer containing the conductive metal particles or fibers dispersed therein.

According to another embodiment, the holding means may be a fiber structure containing the conductive metal particles or fibers dispersed therein.

According to yet another embodiment, the holding means is a woven fiber structure containing conductive metal fibers.

The fiber structure is not limited to a woven textile fabric, and may be any one of suitable fiber structures including nonwoven fabrics and paper sheets.

The material activating device may be formed by replacing the conductive metal plate of either of the foregoing two patented material activating devices with conductive metal particles or conductive metal fibers dispersed in a layer of a polymeric material or a fiber structure or conductive metal fibers woven into a fiber structure.

This material activating device is based on a new knowledge acquired by the inventors of the present invention that the operation and effect of the conductive metal dispersed between the radioactive layer of the radioactive means and the material to be activated are the same as those of the continuous conductive metal layer.

The conductive metal particles or the conductive metal fibers dispersed in the polymeric layer are not limited to those of a single material. A mixture of metal particles or fibers of a plurality of materials may be dispersed in the polymeric layer to provide the same effect as a layered structure formed by superposing metal plates of different materials.

The degree of activation of the material can be changed by changing the materials of the particles or the fibers to be mixed or the material-to-material mixing ratio between particles or fibers of different materials to be mixed or the heavy-to-light metal mixing ratio of particles or fibers of a heavy metal to those of a light metal to be mixed.

When the polymeric material in which the conductive metal particles or fibers are dispersed is a coating material, a conductive metal layer can be easily formed on a surface of a member to be activated by applying the coating material to the surface of the member to be activated.

The fiber structure in which the conductive metal particles or fibers are dispersed may be, for example, a sports wrist band to be put on the wrist when one plays a sport, an athletic joint supporter, a piece of clothing, a sheet, a blanket, or a paper sheet.

The material activating device can be formed in any size and in any shape, and hence can be used for activating a material in various fields in which the foregoing two patented material activating devices cannot be used.

A means for solving the foregoing problem is a material activating device including a radioactive layer of a radioactive means that emits radioactive rays for irradiating a material to be activated, and a conductive metal layer disposed on one side of the radioactive layer of the radioactive means so as to be interposed between the radioactive layer of the radioactive means and the material to be activated, wherein the conductive metal layer is the wall of a hollow casing of a conductive metal, and the radioactive layer of the radioactive means is disposed inside the casing.

According to some embodiments, the effect of activating a material can be enhanced by forming the casing in a shape suitable for the material to be activated, such as a shape resembling a circular cylinder, a polygonal cylinder, a circular cone or a rectangular pyramid.

When the casing resembling a circular cylinder is used for pressing a vital spot on a human body, the touch of the casing to the human body can be softened if one end of the casing is rounded in a semispherical or a semi-ellipsoidal shape.

The material activating device can be easily attached to a material to be activated when a flat surface is formed in a surface of the tubular casing.

The material activating device can be easily fabricated by forming the casing in a circular cylinder of a conductive metal, inserting the radioactive means in the casing and flattening the casing having the shape of a circular cylinder so as to form a radioactive layer of the radioactive means and to hold the radioactive layer of the radioactive means.

A base member made of a conductive metal is attached to the casing in close contact with the casing, and the material activating device is attached to a material to be activated with the base member joined to the material to be activated.

Thus the conductive metal layer interposed between the radioactive layer of the radioactive material and the material to be activated can be formed in an optimum size and an optimum weight, and the material activating device can be easily attached to an object by forming the base member in a shape conforming to that of the object.

A plurality of edges are formed in the base member. Thus the degree of activation of the object can be enhanced by enhancing the intensities of the electric and the magnetic field locally around the edges.

The base member is formed by combining a plurality of polygonal, annular members made of a conductive metal. Thus a plurality of edges are formed in the base member.

The plurality of polygonal, annular members are made of different conductive metals. Thus the degree of activation of the material forming the object can be further enhanced.

A means for solving the foregoing problem is a material activating device including a radioactive layer of a radioactive means that emits radioactive rays for irradiating a material to be activated, and a conductive polymer layer disposed on one side of the radioactive layer of the radioactive means so as to be interposed between the radioactive layer of the radioactive means and the material to be activated.

A conductive polymer forming the conductive polymer layer is polyacene or polypyrrole.

The material activating device can be formed by replacing the conductive metal layer of either of the foregoing two patented material activating devices with a conductive polymer layer. The conductive polymer is used on the basis of a newly acquired knowledge that materials suitable for forming the layer interposed between the radioactive means and the material to be activated are not limited to metals.

It is preferable to coat a surface of the conductive polymer layer with a conductive metal film of a conductive metal.

The metal film may be formed by, for example, vacuum evaporation, sputtering, electroplating, electroless plating or the like or may be formed by pasting an aluminum foil, a gold foil, a silver foil, a copper foil or the like to the surface of the conductive polymer layer.

The material activating device may further include a plurality of conductive polymer layers, the conductive polymer layers are superposed, and an insulating layer made of an electrically insulating material may be interposed between the adjacent conductive polymer layers.

A single or a plurality of insulating layers made of the electrically insulating material may be placed in the plurality of conductive metal layers.

A graphite layer may be interposed between the conductive polymer layer and the radioactive layer of the radioactive means in close contact with a surface of the conductive polymer layer.

A conductive polymer layer or a conductive metal film may be interposed between the graphite layer and the radioactive layer of the radioactive means.

The material activating device may include the graphite layer attached in close contact to the surface of the conductive polymer layer or the metal film to reduce the work function on the surface of the conductive polymer layer or the conductive metal layer. Consequently, the degree of activation of the material is improved.

A commercially available graphite sheet may be used for forming the graphite layer or a sheet formed by spreading a mixture prepared by dispersing graphite particles in a polymeric material, such as a coating material or rubber, in a sheet and setting the sheet may be used as the graphite layer.

The radioactive layer of the radioactive means may be formed on a surface of the conductive polymer layer or the metal film formed on a surface of the conductive polymer layer by printing.

A means for solving the foregoing problem is a material activating device including a radioactive means that emits radioactive rays for irradiating a material to be activated to activate the material, wherein the radioactive means includes radioactive mineral particles and conductive metal particles or fibers.

The conductive metal particles or fibers may be those of a heavy metal and those of a light metal.

The material activating device is designed on the basis of a new knowledge acquired by the inventors of the present invention that the operation of a radioactive layer of a radioactive means containing particles or fibers of a conductive metal is the same as that of a conductive metal layer.

Thus the object can be efficiently activated even in a state where it is difficult to place the conductive metal layer on the side of the object to be activated.

The degree of activation can be increased to the highest possible degree by changing the heavy-to-light metal mixing ratio of particles or fibers of the heavy metal to those of the light metal.

A means for solving the foregoing problem is a material activating device including a radioactive layer of a radioactive means that emits radioactive rays for irradiating a material to be activated to activate the material, wherein the radioactive layer of the radioactive means contains radioactive mineral particles and graphite particles or fibers.

The material activating device is based on a new knowledge acquired by the inventors of the present invention that a radioactive layer of a radioactive means containing graphite particles or fibers further increases the degree of activation of a material.

The degree of activation can be increased to the highest possible degree by changing the particle size of the graphite particles or the fiber length of the graphite fibers so as to be suitable for an object to be activated.

In the material activating device, the radioactive layer of the radioactive means is a ceramic layer containing particles of a radioactive mineral and particles or fibers of a conductive metal or graphite dispersed therein.

Thus the material can be activated even in an environment in which the foregoing two patented material activating devices cannot be used because the ceramic layer serving as the radioactive layer of the radioactive means is excellent in corrosion resistance and heat resistance.

The material activating device may be attached to a surface of an object by using, for example, a bracket, a metal or resin fastening band or bolts in combination with the material activating device or can be attached or adhesively bonded to a surface of an object with an adhesive tape or an adhesive.

When an adhesive tape is used for attaching the material activating device to, for example, an engine of an automobile, the material activating device can be removed from the engine and can be attached to the engine of another newly procured automobile.

In a material activating device, the radioactive layer of the radioactive means is a polymer layer holding radioactive mineral particles, and particles or fibers of a conductive metal or graphite.

When a coating material is used for forming the polymer layer, the coating material is applied in a coating film to a surface of an object to be activated, the coating film is dried and solidified to form the radioactive layer of the radioactive means on the surface of the object to be activated.

Thus the radioactive layer of the radioactive means can be easily formed on a surface of a very large area, such as the inside surface of a lower part of the hull of a ship.

In one embodiment of a material activating device, the radioactive layer of the radioactive means is a fluid layer of a viscous fluid holding radioactive mineral particles, and particles or fibers of a conductive metal or graphite.

In another embodiment of a material activating device, the radioactive layer of the radioactive means is a support member holding the radioactive mineral particles, and the particles or fibers of the conductive metal or graphite.

In the material activating device, the radioactive mineral particles held by the viscous fluid or by the support member to form the radioactive layer of the radioactive means. Therefore, the material activating device can be easily attached to an object to be activated.

In a material activating device, the radioactive layer of the radioactive means may be inserted in a hole formed in an object of a material to be activated.

The radioactive layer of the radioactive means inserted in the hole may be sealed in the hole by fitting a plug in the hole.

In a material activating device, the radioactive layer of the radioactive means may be attached to a surface of an object of a material to be activated.

In a material activating device, the radioactive layer of the radioactive means may be printed on a surface of an object of a material to be activated.

The material activating device can easily attach the particles of the radioactive mineral, and particles or fibers of the conductive metal or graphite to the object to be activated and can efficiently activate the object.

The object of the material to be activated may be the body of a forming die, such as a press die or an injection molding die.

The object of the material to be activated may be a main part of a machine tool, such as the bed, the head, the table, the spindle or the headstock of, for example, a lathe or a machining center, the screw cylinder of an injection molding machine, the head or the blow mold of a blow molding machine, a lubricating device for lubricating a cutting tool on a machine tool or a mold releasing agent spraying device for spraying a mold releasing agent on a mold.

The object of the material to be activated may be an industrial tool, such as a cutting tool, a cutter or a grinding wheel.

The material activating device includes the radioactive layer of the radioactive means containing particles of the radioactive mineral and particles or fibers of the conductive metal or graphite and attached to a forming die, a machine tool or a member made of a conductive metal.

It is proved that the material activating device improves the flow of a lubricant, a cooling liquid or a mold releasing agent and lubricating, cooling or mold releasing effect in addition to the improvement of the surface condition and the damping effect of the object and the improvement of the accuracy of the shape and the surface roughness of a workpiece.

The electrodes of a lead-acid battery can be activated to recover the ability deteriorated by sulfation by using the material activating device.

The intensity of the ignition spark can be enhanced by activating a secondary cable connected to a spark plug of an engine by the material activating device.

In the material activating device the particles of the mineral contained in the radioactive layer of the radioactive means emit weak radioactive rays to supply electrons to an object to be activated Each of a battery cable connected to the electrodes of a lead-acid battery and a secondary cable connected to a spark plug is formed by coating a conductive cable for carrying a current with an insulating member.

When the material activating device is attached to a battery cable or a secondary cable, there is built a capacitor including the material activating device, the conductive cable and the insulating member interposed between the material activating device and the conductive cable.

It is inferred that electrons accumulated in the capacitor flow into the electrodes of the lead-acid battery and decompose lead sulfate crystals deposited on the electrodes due to sulfation and thereby the original ability of the lead-acid battery deteriorated by sulfation can be recovered.

It is also inferred that the electrons accumulated in the capacitor flows into the spark plug together with an ignition current according to ignition timing and enhance the intensity of the ignition spark.

Also disclosed is a material activating device including a radioactive layer of a radioactive means that emits radioactive rays for irradiating a material to be activated, and a conductive metal layer disposed on one side of the radioactive layer of the radioactive means so as to be interposed between the radioactive layer of the radioactive means and the material, wherein the radioactive layer of the radioactive means is formed on a surface of the conductive metal layer by printing.

The conductive metal layer is a metal foil of a conductive metal, and the radioactive layer of the radioactive means is formed on the metal foil by printing. Thus the material activating device can be formed in a very small thickness.

An adhesive tape is attached to a surface opposite a surface on which the radioactive layer of the radioactive means is formed. Thus the material activating device of a very small thickness can be easily attached to a surface of an object to be activated.

The radioactive layer of the radioactive means may be formed in a predetermined pattern on a conductive polymer layer, a conductive metal film or a surface of an object to be activated by, for example, silk-screen printing.

The radioactive layer of the radioactive means may be a solid layer or a patterned layer of straight lines, curved lines, a grid, polka dots, figures, characters or a combination of some of those.

The density of the radioactive means per unit area can be easily changed by changing the width of lines forming a grid pattern and the interval between the lines, the diameter of dots forming a polka-dot pattern and interval between the dots or the size of figures and intervals between the figures.

Effect of the Invention

As obvious from the foregoing description, the present invention provides material activating devices respectively having different shapes, capable of being applied to various uses in a wide application field and having further improved material activating effect.

REFERENCE CHARACTERS

Figure 1:
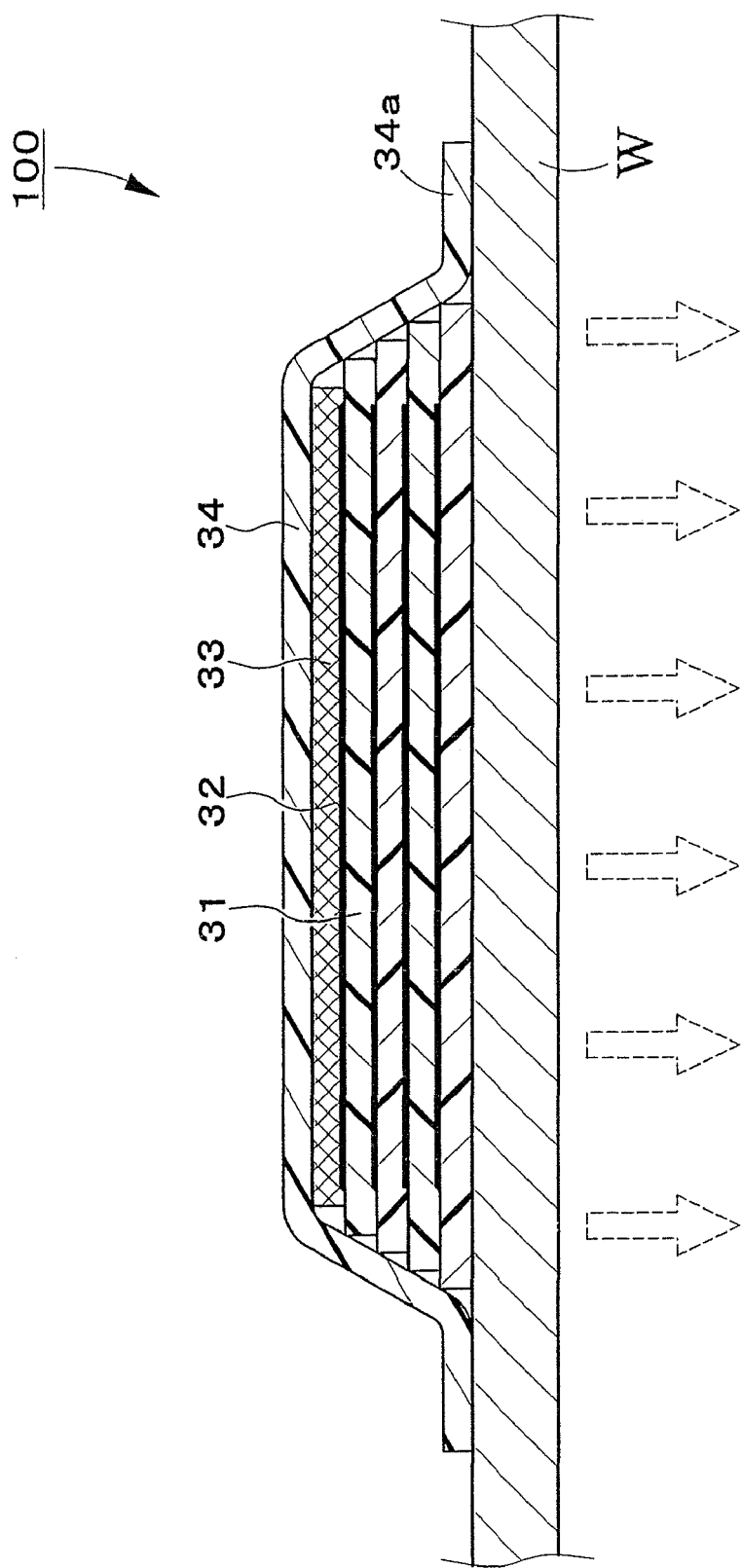
FIG. 1 is a sectional view of a material activating device in a first embodiment according to the present invention.
Figure 2:
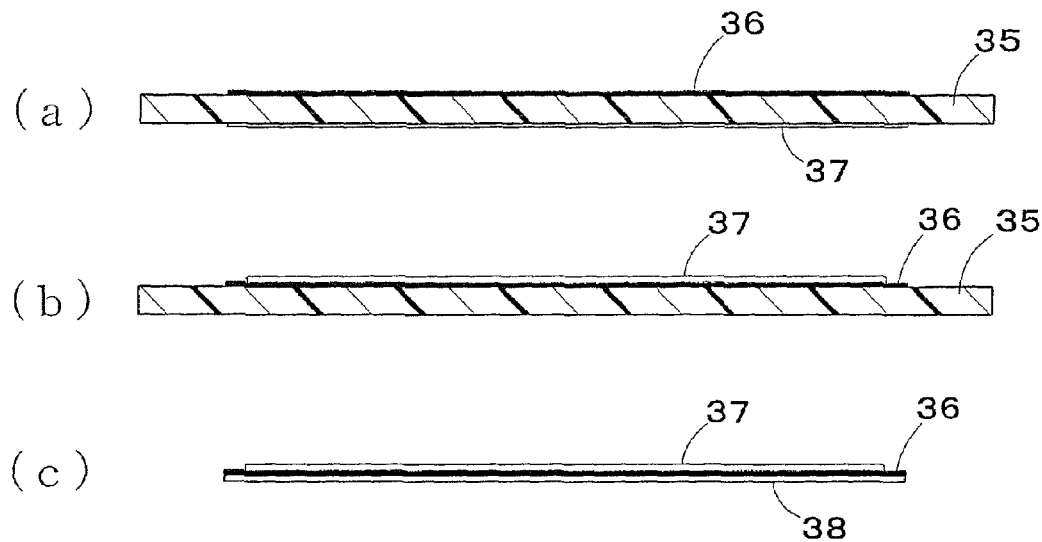
FIG. 2 is a view of modifications of the material activating device in the first embodiment.
Figure 3:
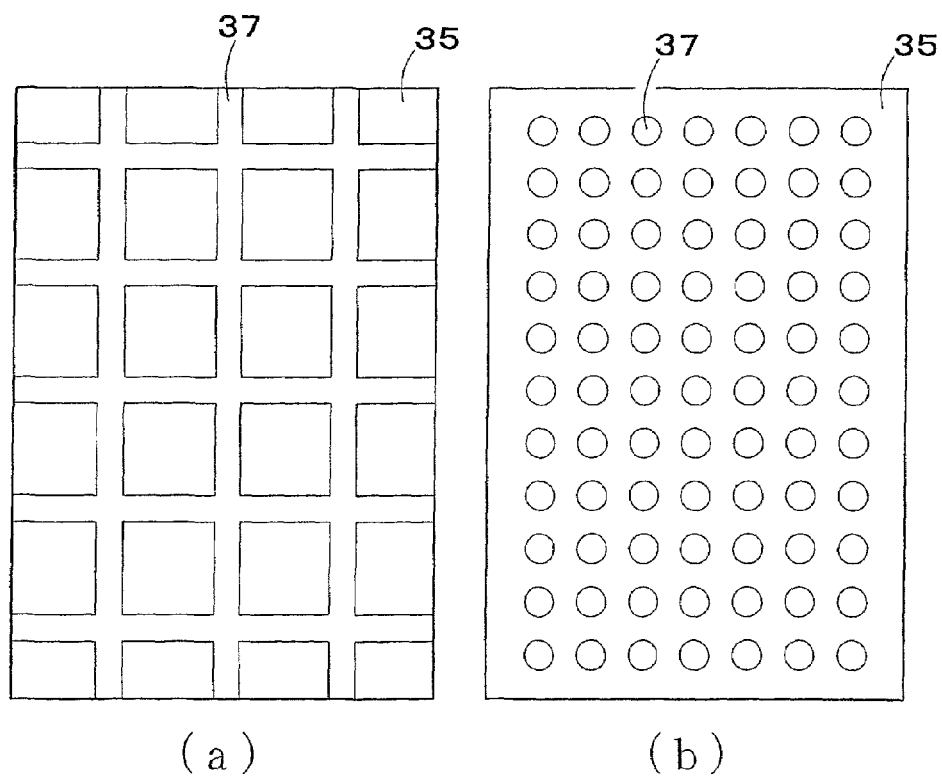
FIG. 3 is a view of modifications of the material activating device in the first embodiment.

D: Duct
M: Material to be activated
1: Material activating device disclosed in Jpn. Pat. No. 3065590
2: Radioactive layer of a radioactive means
3, 4: Copper plates
5: Lead plate
6: Copper plate
7: Rivet
10: Material activating device disclosed in Jpn. Pat. No. 3065590
11, 12: Holding members
13: Monazite particle
20: Material activating device disclosed in Jpn. Pat. No. 3573412
21: Radioactive layer of a radioactive means
22: Conductive metal layer
31: Polyethylene film
32: Metal film
33: Radioactive layer of a radioactive means
34: Nylon film
35: Polyethylene film 36: Metal foil
37: Radioactive layer of a radioactive means
38: Adhesive tape
41: Radioactive layer of a radioactive means
42, 43: Conductive metal plates
44: Insulating layer
51: Radioactive layer of a radioactive means
52: Graphite layer
53, 54: Conductive metal layers
61: Radioactive layer of a radioactive means
62, 63: Polymer layers
71, 72: Hollow casings
73: Particle of radioactive mineral
74: Particle of a conductive metal
75: Graphite particle
76: Columnar member
77: Cavity
78: Thick rectangular plate
79: Thin plate
81: Particle of radioactive mineral
82: Conductive metal particle
83: Graphite particle
84: Coating
101, 103, 105: Hollow casings
102, 104, 106: Base members
107, 108, 109, 110: Annular members
121: Conductive polymer thin plate
122: Radioactive layer of a radioactive means
123: Conductive polymer thin plate
124: Conductive metal thin film
125: Radioactive layer of a radioactive means
126: Conductive metal particle of fiber
127: Graphite particle of fiber
130: Material activating block
131: Radioactive mineral particle
132: Conductive metal particle or fiber
133: Graphite particle or fiber
140: Activating member
141: Radioactive mineral particle
142: Conductive metal particle or fiber
143: Graphite particle or fiber
151: Forming die
152: Bottomed bore
153: Radioactive member
100: Material activating device in a first embodiment
200: Material activating device in a second embodiment
300: Material activating device in a third embodiment
310: Material activating device in a modification of the material activating device in the third embodiment
400: Material activating device in a fourth embodiment
410: Material activating device in a modification of the material activating device in the fourth embodiment
500: Material activating device in a fifth embodiment
510: Material activating device in a modification of the material activating device in the fifth embodiment
520: Material activating device in a modification of the material activating device in the fifth embodiment
530: Material activating device in a modification of the material activating device in the fifth embodiment
540: Material activating device in a modification of the material activating device in the fifth embodiment
550: Material activating device in a modification of the material activating device in the fifth embodiment
600: Material activating device in a sixth embodiment
610: Material activating device in a modification of the material activating device in the sixth embodiment
620: Material activating device in a modification of the material activating device in the sixth embodiment
630: Material activating device in a modification of the material activating device in the sixth embodiment
700: Material activating device in a seventh embodiment
710: Material activating device in a modification of the material activating device in the seventh embodiment
800: Material activating device in an eighth embodiment
810: Material activating device in a modification of the material activating device in the eighth embodiment
900: Material activating device in a ninth embodiment

BEST MODE FOR CARRYING OUT THE INVENTION

Material activating devices in preferred embodiment according to the present invention will be described with reference to FIGS. 1 to 28.

First Embodiment

A material activating device in a first embodiment according to the present invention will be described with reference to FIG. 1.

The material activating device 100 is a laminated structure formed by laminating a plurality of component layers each formed by forming an aluminum film (metal film) 32 of a thickness between about 10 and about 100 μm on a surface of a polyethylene film 31 of a thickness between about 0.1 and 1.0 mm by vacuum evaporation, and laminating a radioactive layer 33 to the assembly of the component layers. The radioactive layer 33 is a polymer band containing monazite particles that emit weak radioactive rays.

The laminated structure is attached to the outside surface 33a of a conductive metal wall W having an inside surface contiguous with a material to be activated, not shown. The laminated structure is covered with a nylon film of a thickness between about 0.5 and about 1 mm.

The radioactive layer 33 is formed by spreading a mixture of particles of a radioactive mineral, particles or fibers of a conductive metal, graphite particles or fibers and a polymer in a film and setting the film. The radioactive mineral is, for example, phosphorous ore, titanium ore, bastonäsite, zircon or samarium. The conductive metal is, for example, copper, zinc, titanium or tungsten.

Radioactive rays having a dose equivalent on the order of 100 mSv emitted by the radioactive layer 33 ionize the material on the inner side of the wall W.

The conductive metal particles or fibers contained in the radioactive layer 33, the metal films 32 and the wall W are charged with charges produced by ionization. Consequently, an electric field and a magnetic field are created. The electric field and the magnetic field act on the ionized material to promote the activation of the material greatly.

The graphite particles or fibers contained in the radioactive layer 33 reduce work function on the surfaces of the conductive metal particles or fibers contained in the radioactive layer 33 to improve the degree of activation of the material.

Figure 29:
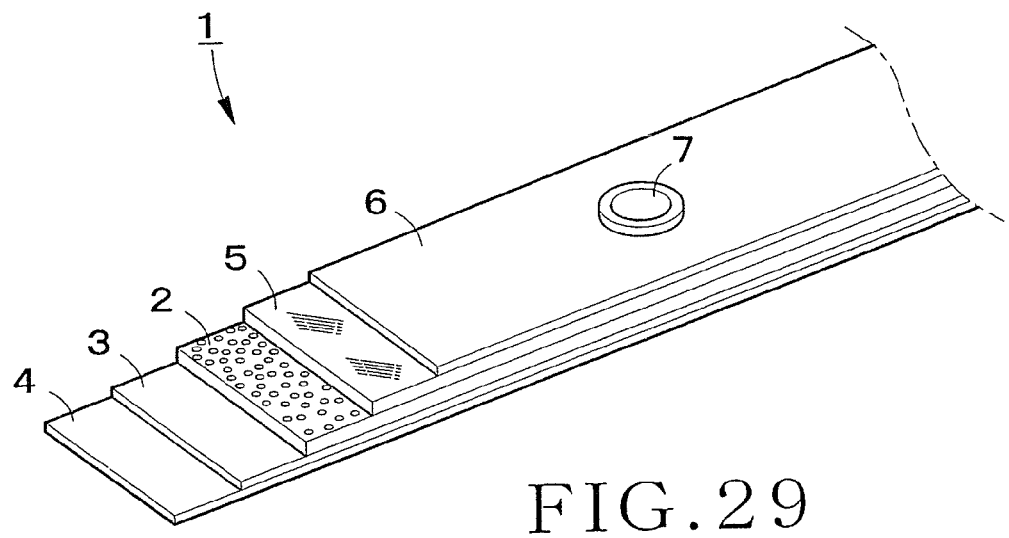
FIG. 29 is a perspective view of a material activating device disclosed in Jpn. Pat. No. 3065590.
Figure 30:
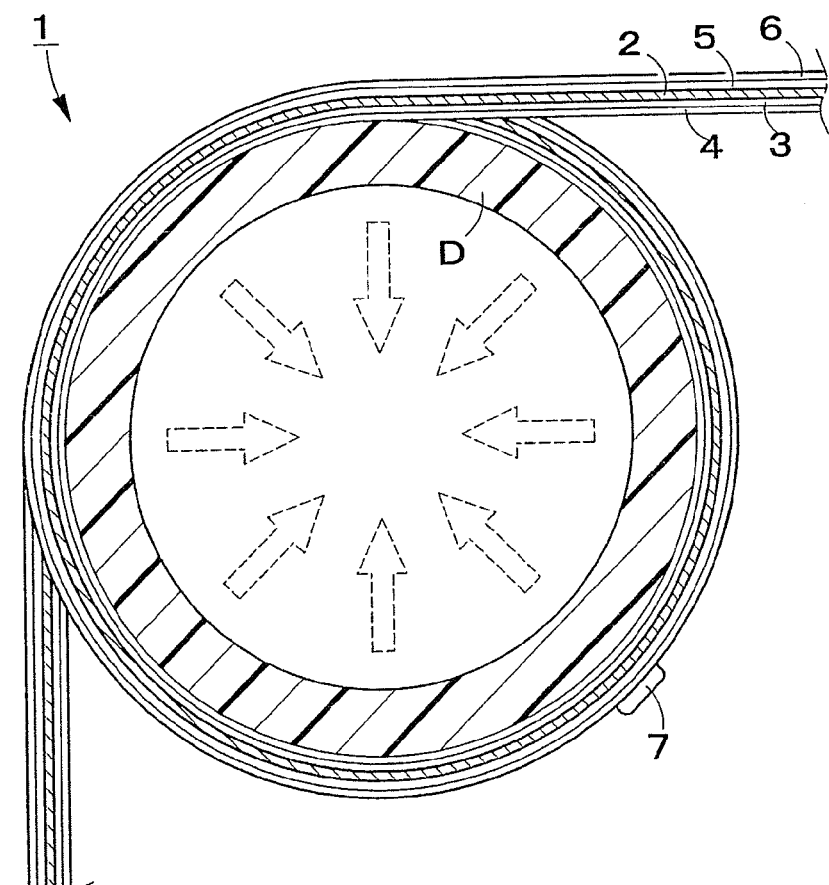
FIG. 30 is a sectional view of the material activating device shown in FIG. 29 attached to a duct.
Figure 31:
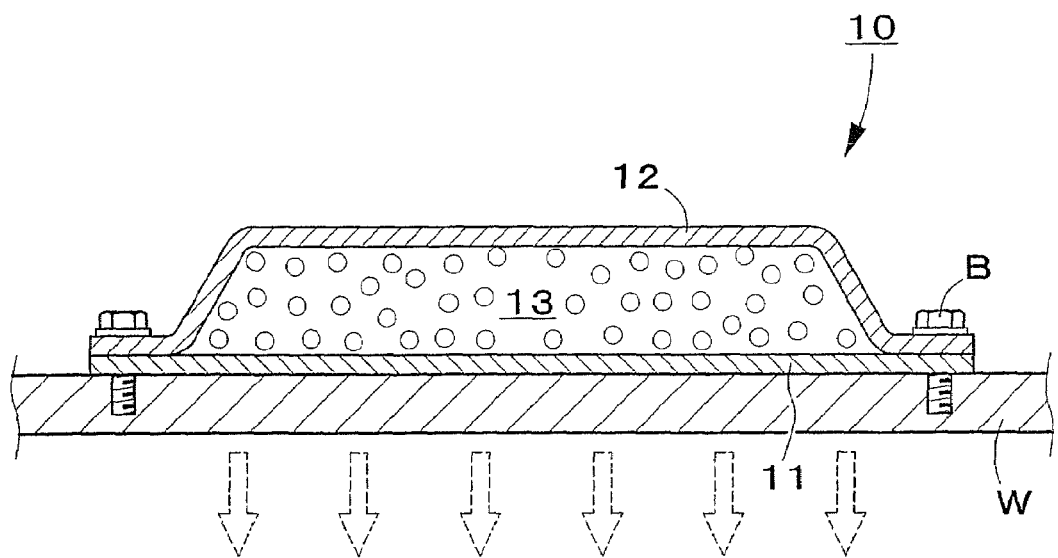
FIG. 31 is a sectional view of a material activating device disclosed in Jpn. Pat. No. 3065590.
Figure 32:
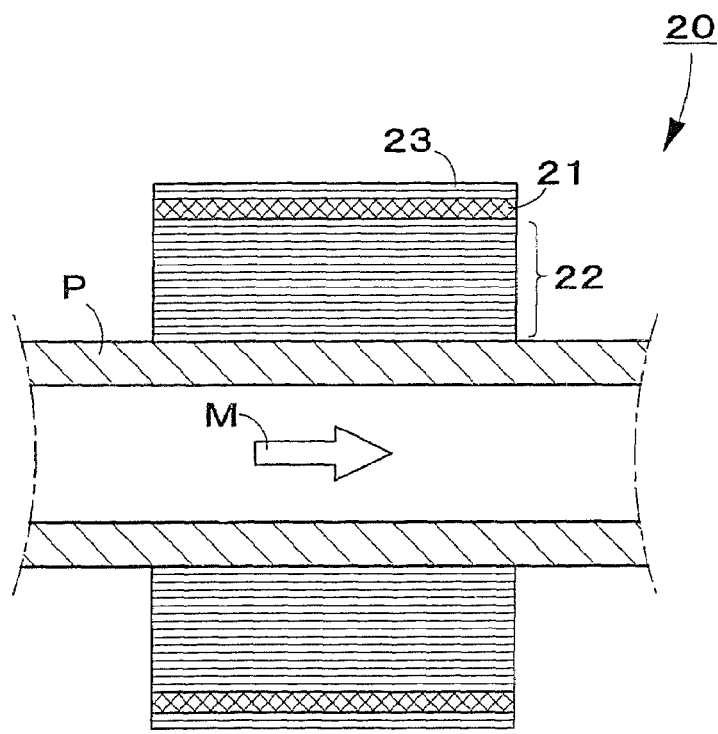
FIG. 32 is a sectional view of a material activating device disclosed in Jpn. Pat. No. 3573412.

The material activating device 100 in the first embodiment, as compared with the known material activating device 1 shown in FIGS. 29 and 30, is very thin and very flexible. Therefore, the material activating device 100 can be easily attached to the wall W even if the wall W is curved.

The metal films 32 are electrically insulated from each other by the electrically insulating polyethylene films 31 and are spaced apart from each other by a distance equal to the thickness of the polyethylene films 31. Consequently, the effect of the radioactive rays emitted by the radioactive layer 33 on activating the material can be further enhanced.

The material activating device 100 in the first embodiment is supposed to be used for activating a comparatively small material. Some uses need a material activating device having an area of several square meters.

For example, mushroom cultivation needs to keep vessels containing a culture medium planted with mushroom fungus and arranged on shelves in still standing in an air-conditioned environment of controlled temperature and humidity for about two months to culture the mushroom fungus. It has been proved that the growing speed of mushrooms increases and the quality of mushrooms is improved when the surfaces of the shelves are covered with the material activating device of the present invention.

It has been proved that the material activating device of the present invention spread on the floor of a pig house of a hog raising farm is effective in reducing the death rate of newborn baby pigs being raised in a the pig house.

When an material activating device having a large area is needed, a metal foil 36, such as an aluminum foil, is laminated to one of the surfaces of a polyethylene film 35 of an area as large as several square meters, and a radioactive layer 37 is formed on the other surface of the polyethylene film 35 by, for example, silk-screen printing as shown in FIG. 2(a). A material activating device is completed by laminating protective films, not shown, such as polyethylene films, to the metal foil 36 and the radioactive layer 37.

As shown in FIG. 2(b), a metal foil 36 is laminated to one of the surfaces of a polymethylene film 35, and a radioactive layer 37 is formed on the metal foil 36 by, for example, silk-screen printing.

Then, protective films, such as polyethylene films, are laminated to the metal foil 36 and the radioactive layer 37 to complete a material activating device.

When the radioactive layer is formed by silk-screen printing, a radioactive coating material is prepared by mixing radioactive mineral particles, particles or fibers of conductive metal or graphite and a printing ink, and the radioactive coating material is printed in a solid film, in a grid pattern as shown in FIG. 3(a) or in a polka-dot pattern as shown in FIG. 3(b) on a surface of a polyethylene film or a conductive metal film.

When the material activating device is intended for use in mushroom cultivation, the material activating device can be manufactured at a reduced manufacturing cost when the radioactive coating material is printed in separate patterns at intervals corresponding to those at which vessels containing a culture medium planted with mushroom fungus are arranged.

In the material activating device in the first embodiment, the metal film is formed on the surface of the polymer film. When a very thin material activating device is formed by printing a radioactive layer 37 of a radioactive means on one of the surfaces of a metal foil 36, and an adhesive tape 38 is attached to the other surface of the metal foil 36, the material activating device can be easily attached to a surface of an object to be activated.

If the radioactive layer 37 is printed on the surface of the metal foil 36 in a combined pattern of figures and characters, a novel material activating device excellent in design and having high commercial value can be obtained.

Second Embodiment

Material activating devices in a second embodiment according to the present invention will be described with reference to FIGS. 4 and 5.

The material activating devices 200 and 210 are similar in construction to the known material activating device 1 shown in FIGS. 29 and 30. In the material activating devices 200 and 210, a radioactive layer 41 of a radioactive means and conductive metal plates 42 and 43 are superposed, and an insulating layer 44, namely, a thin electrically insulating polyethylene plate, is interposed between the metal plates 42.

Figure 4:
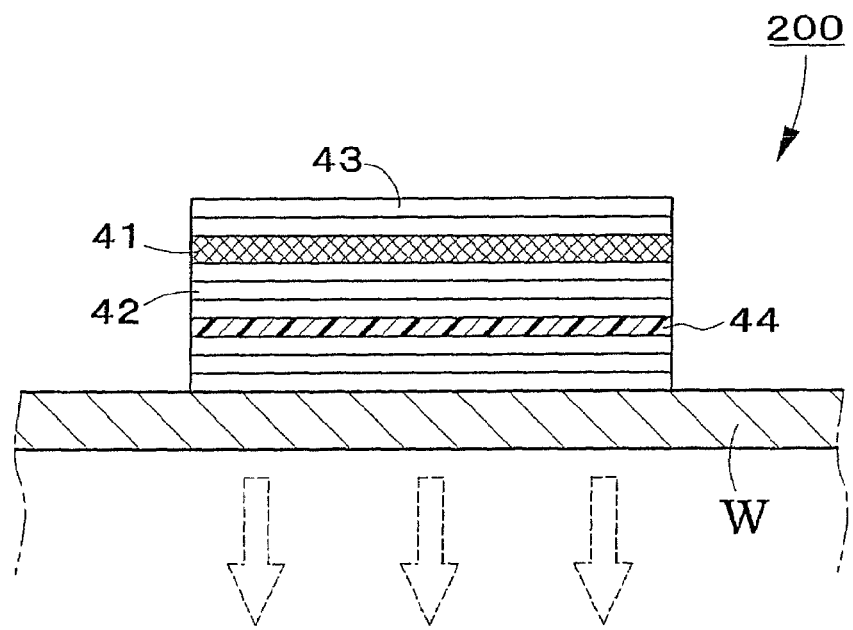
FIG. 4 is a sectional view of a material activating device in a second embodiment according to the present invention.
Figure 5:
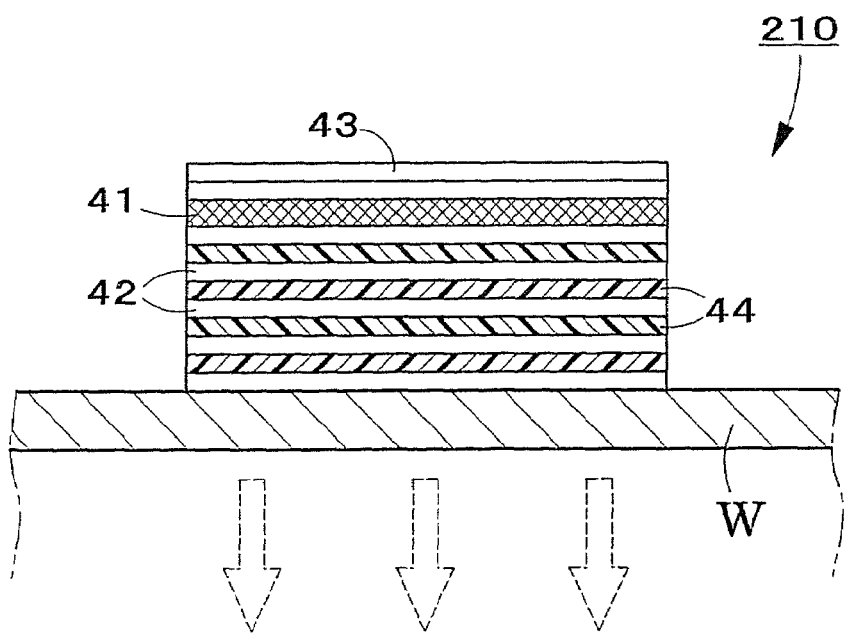
FIG. 5 is a sectional view of a modification of the material activating device in the second embodiment.

In the material activating device 200 shown in FIG. 4, only a single insulating layer 44 is placed between the adjacent ones of the plurality of metal plates 42. In the material activating device 210 shown in FIG. 5, the plurality of metal plates 42 and the plurality of insulating layers 44 are superposed alternately.

The radioactive layer 41 is formed by spreading a mixture of particles of a radioactive mineral, particles or fibers of a conductive metal, graphite particles or fibers and a polymer in a film and setting the film. The radioactive mineral is, for example, monazite, phosphorous ore, titanium ore, bastonäsite, zircon or samarium. The conductive metal is, for example, copper, zinc, titanium or tungsten.

Although further studies are necessary to explain explicitly reasons the material activating devices 200 and 210 in the second embodiment have a material activating effect higher than that of the known material activating device 1, it is inferred that the improved material activating effect owes to potential difference between the conductive metal plates 42 caused by charging the conductive metal plates 42 in different quantities of electric charge due to the electrical insulation of at least some of the conductive metal plates 42 from each other.

Third Embodiment

Material activating devices in a third embodiment according to the present invention will be described with reference to FIGS. 6 and 7.

Each of the material activating devices 300 and 310 has a graphite layer 52 interposed between a wall W made of a conductive metal and having the inside surface contiguous with a material to be activated, not shown, and a radioactive layer 51, and to be placed in close contact with the outside surface of the wall W.

Figure 6:
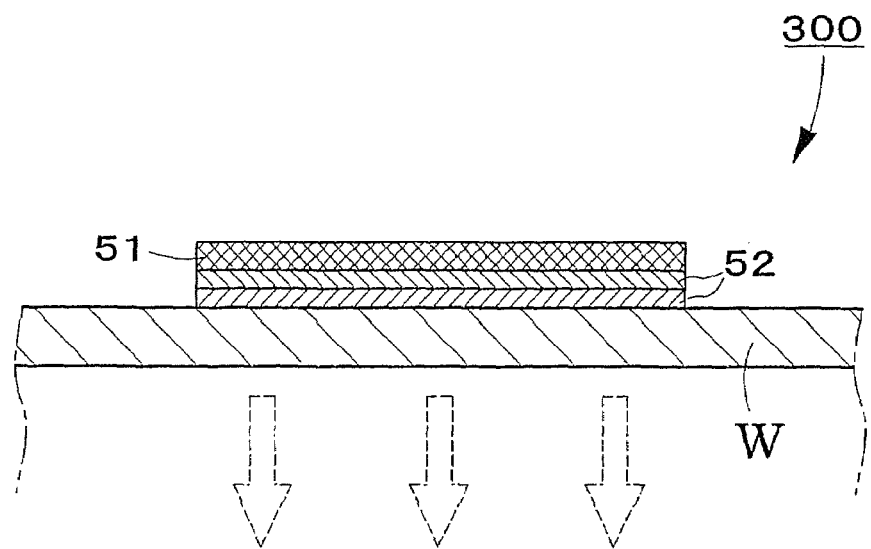
FIG. 6 is a sectional view of a material activating device in a third embodiment according to the present invention.
Figure 7:
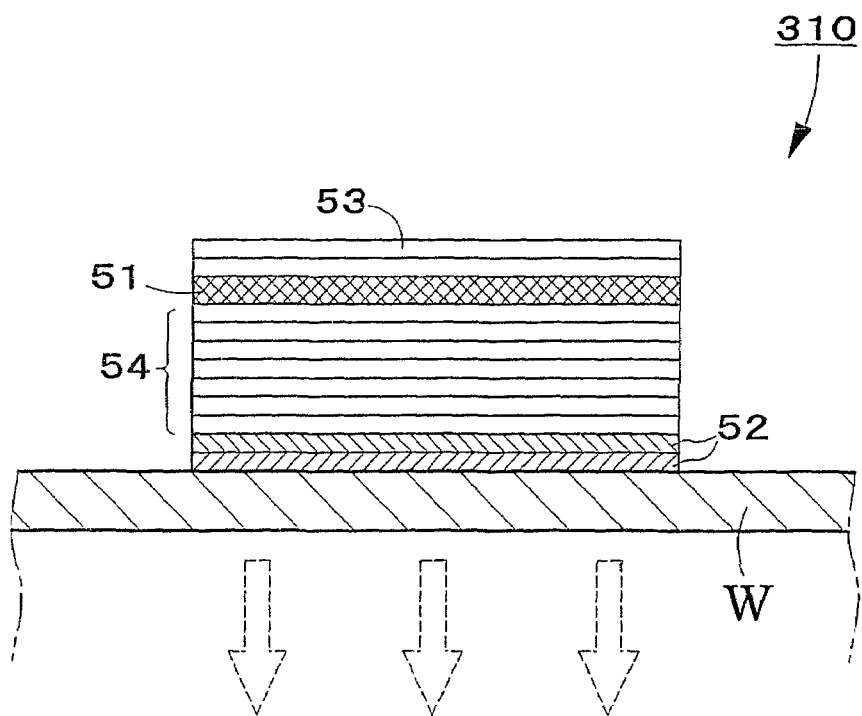
FIG. 7 is a sectional view of a modification of the material activating device in the third embodiment.

The material activating device 300 shown in FIG. 6 has only one radioactive layer 51 and two graphite layers 52. The material activating device 310 shown in FIG. 7 has a plurality of conductive metal layers 53 and 54, and one radioactive layer 51 interposed between the conductive metal layer 53 and 54.

The radioactive layer 51 is formed by spreading a mixture of particles of a radioactive mineral, particles or fibers of a conductive metal, graphite particles or fibers and a polymer in a film and setting the film. The radioactive mineral is, for example, monazite, phosphorous ore, titanium ore, bastonäsite, zircon or samarium. The conductive metal is, for example, copper, zinc, titanium or tungsten.

Each of the material activating devices 300 and 310 in the third embodiment including the radioactive layer 51 and the wall W of a conductive metal has the graphite layer 52 in close contact with the wall W. Consequently, work function on the surface of the wall W can be reduced and the degree of activation of the object can be improved.

Fourth Embodiment

Figure 8:
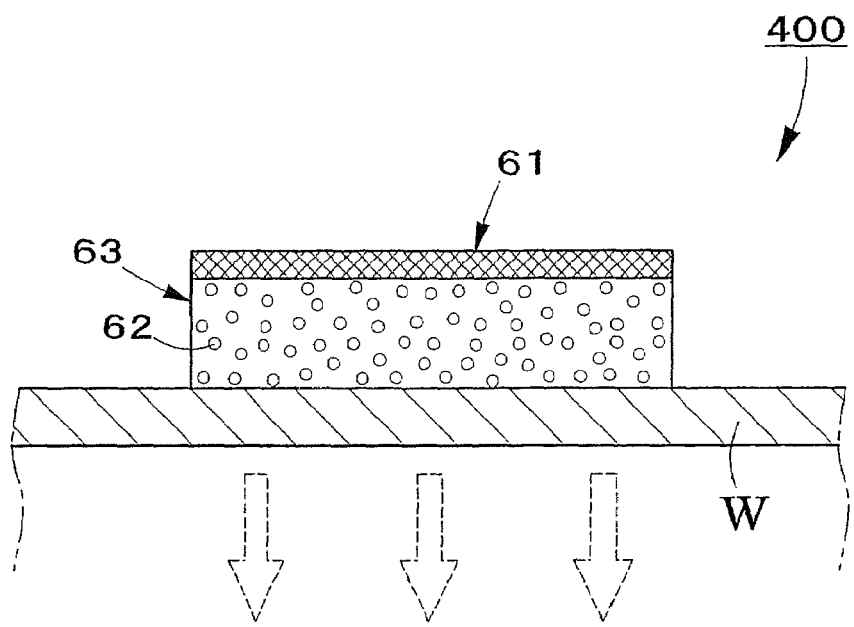
FIG. 8 is a sectional view of a material activating device in a fourth embodiment according to the present invention.
Figure 9:
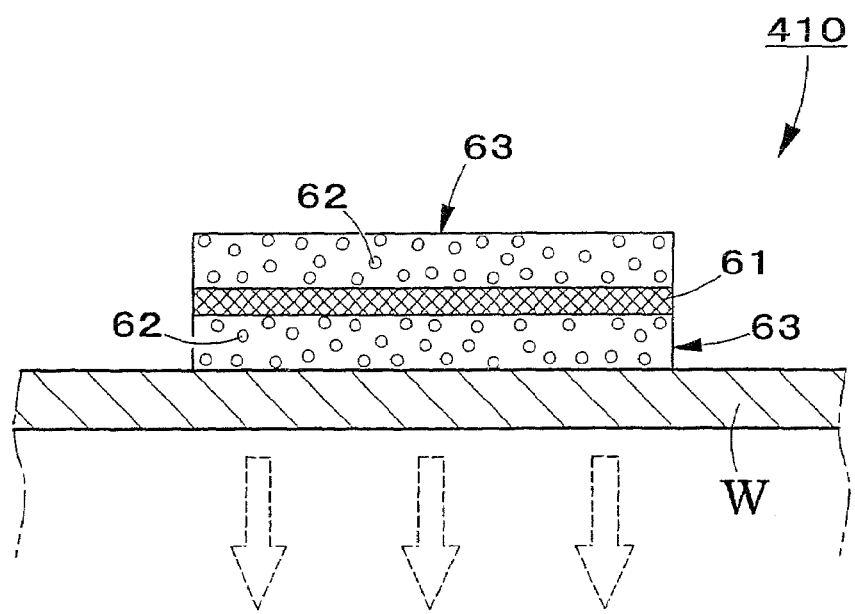
FIG. 9 is a sectional view of a modification of the material activating device in the fourth embodiment.

Material activating devices in a fourth embodiment according to the present invention will be described with reference to FIGS. 8 and 9.

Each of the material activating devices 400 and 410 has a radioactive layer 61 and a polymer layer 63 containing conductive metal particles 62 or conductive metal fibers 62 dispersed therein.

The radioactive layer 61 is formed by spreading a mixture of particles of a radioactive mineral, particles or fibers of a conductive metal, graphite particles or fibers and a polymer in a film and setting the film. The radioactive mineral is, for example, monazite, phosphorous ore, titanium ore, bastonäsite, zircon or samarium. The conductive metal is, for example, copper, zinc, titanium or tungsten.

The polymer layer 63 containing the conductive metal particles 62 or the conductive metal fibers 62 dispersed therein is a thin resin or rubber plate replacing the conductive metal plates 3, 4 and 6 of the known material activating device 1 shown in FIGS. 29 and 30.

The construction of the material activating devices 400 and 410 is based on a new knowledge acquired by the inventors of the present invention that the operation and effect of the conductive metal particles 62 or the conductive metal fibers 62 dispersed in the polymer layer 63 interposed between the radioactive layer 61 and a material to be activated are the same as those of a continuous conductive meal layer.

Preferably, the conductive metal particles 62 or the conductive metal fibers 62 disposed in the polymer layer 63 are particles or fibers of a heavy metal and a light metal.

The heavy metal is such as having a specific weight of seven or above, such as tungsten, copper, iron or zinc. The light metal is such as having a specific weight of five or below, such as magnesium, aluminum or titanium.

The effect of the mixture of the particles or fibers of the heavy and the light metal is the same as that of superposed metal layers of different materials.

The heavy metal and the light metal forming the conductive metal particles 62 of the conductive metal fibers 62, the heavy-to-light metal mixing ratio, namely, the mixing ratio between the heavy metal and the light metal particles or fibers, the particle size of the particles or the fiber length of the fibers are selectively determined according to the material to be activated and the degree of activation of the material.

For example, when the material to be activated is a liquid, the heavy-to-light metal mixing ratio may be between 10:90 and 30:70. When the material to be activated is a gas, the heavy-to-light metal mixing ratio of particles or fibers of the heavy metal to those of the light metal may be between 25:75 and 45:55.

The material activating devices 400 and 410 in the fourth embodiment can be formed in an optional shape and an optional size because the material activating devices 400 and 410 do not include any conductive metal plates. Thus the material activating devices 400 and 410 can be used in various fields for activating materials.

A textile material, such as a woven fabric or a nonwoven fabric, containing the conductive metal particles 62 or the conductive metal fibers 62 disperse therein may be used instead of the polymer layer 63.

The textile material containing the conductive metal particles 62 or the conductive metal fibers 62 disperse therein can be produced by spreading a liquid polymer containing the conductive metal particles 62 or the conductive metal fibers 62 dispersed therein on or impregnating a woven fabric or a nonwoven fabric with the same liquid polymer and setting the liquid polymer.

A textile fabric produced by weaving yarns containing conductive metal fibers may be used instead of the polymer layer 63.

The human body can be activated by a wrist band, such as a sports wrist band used, for example, by a tennis player, containing conductive metal fibers knitted therein and provided on its surface with a radioactive layer.

Fifth Embodiment

Material activating devices in a fifth embodiment according to the present invention will be described with reference to FIGS. 10 to 18.

FIGS. 10(a), 10(b), 10(c), 10(d), 10(e) and 10(f) are a front elevation, a plan view, a bottom view, a left end view, a right end view and a perspective view, respectively, of a material activating device 500 in the fifth embodiment.

FIGS. 11(a), 11(b), 11(c), 11(d), 11(e) and 11(f) are a front elevation, a plan view, a bottom view, a left end view, a right end view and a perspective view, respectively, of a material activating device 510 in the fifth embodiment. A back view of the material activating device 510 is the same as the front elevation shown in FIG. 11(a).

Figure 11:
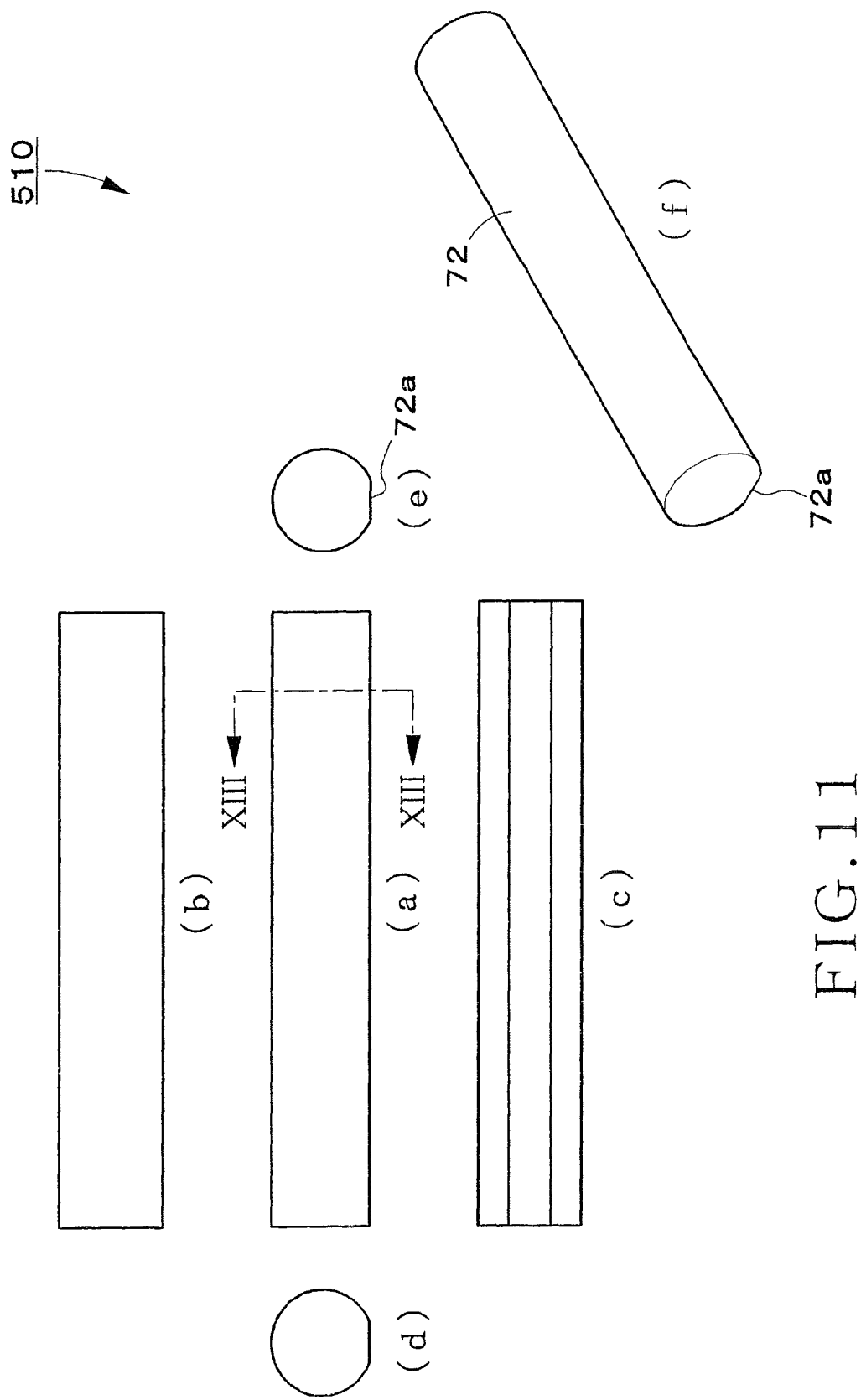
FIG. 11 is a sectional view of a modification of the material activating device in the fifth embodiment.
Figure 12:
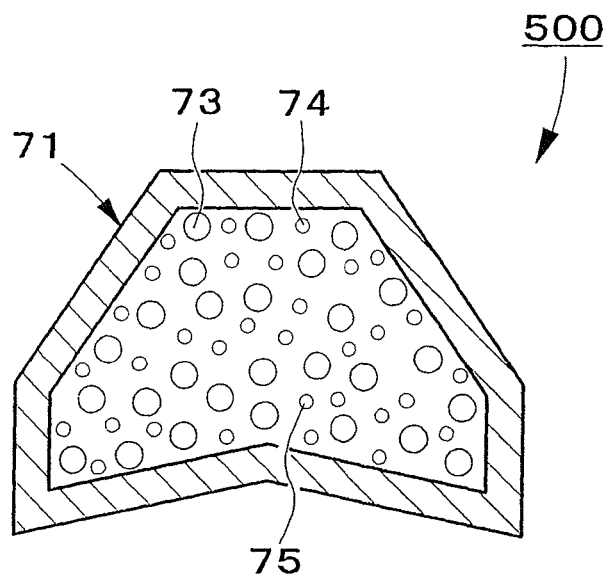
FIG. 12 is a cross-sectional view taken on the chain line XI-XI in FIG. 10(a).
Figure 13:
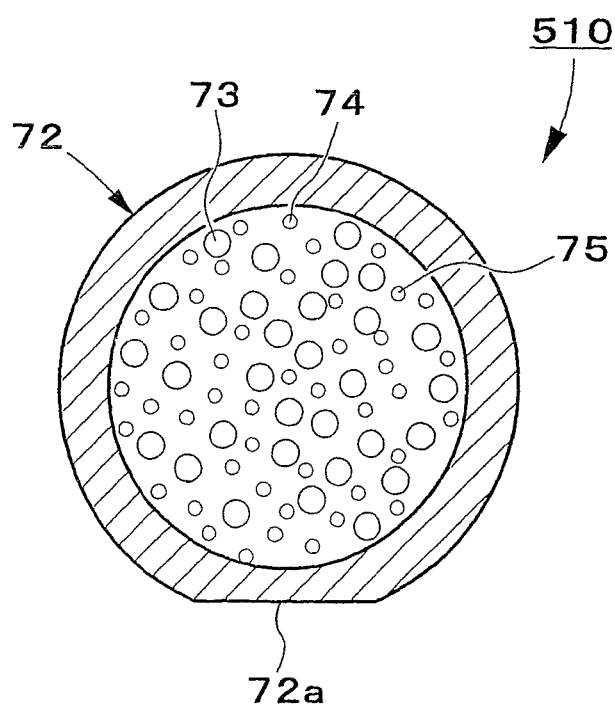
FIG. 13 is a cross-sectional view taken on the chain line XII-XII in FIG. 11(a).

FIG. 12 is a cross-sectional view take on the line XI-XI in FIG. 10(a). FIG. 13 is a cross-sectional view taken on the line XII-XII in FIG. 11(a).

The material activating devices 500 and 510 in the fifth embodiment have tubular casings 71 and 72, respectively, having a length between about 40 and about 50 mm and made of a conductive metal. The casings 71 and 72 are filled up with a mixture of radioactive mineral particles that emit radioactive rays, conductive metal particles 74 and graphite particles 75.

Weak radioactive rays emitted by the radioactive mineral particles 73 ionize a material contiguous with the outside surfaces of the casings 71 and 72.

At the same time, the conductive metal particles 74 and the walls W of the casings 71 and 72 are charged with charges produced by ionization. Consequently, an electric field and a magnetic field are created. The electric and the magnetic field promote the activation of the ionized material greatly.

The graphite particles 75 contained in the casings 71 and 72 reduce work function on the surfaces of the conductive metal particles 74 and the tubular casings 71 and 72 and thereby the degree of activation of the material is improved.

The walls of the tubular casings 71 and 72 of the material activating devices 500 and 510 serve as conductive metal layers. Therefore, liquids flowing through, for example, plastic pipes can be efficiently activated when the material activating devices 500 and 510 are inserted in the plastic pipes.

Figure 10:
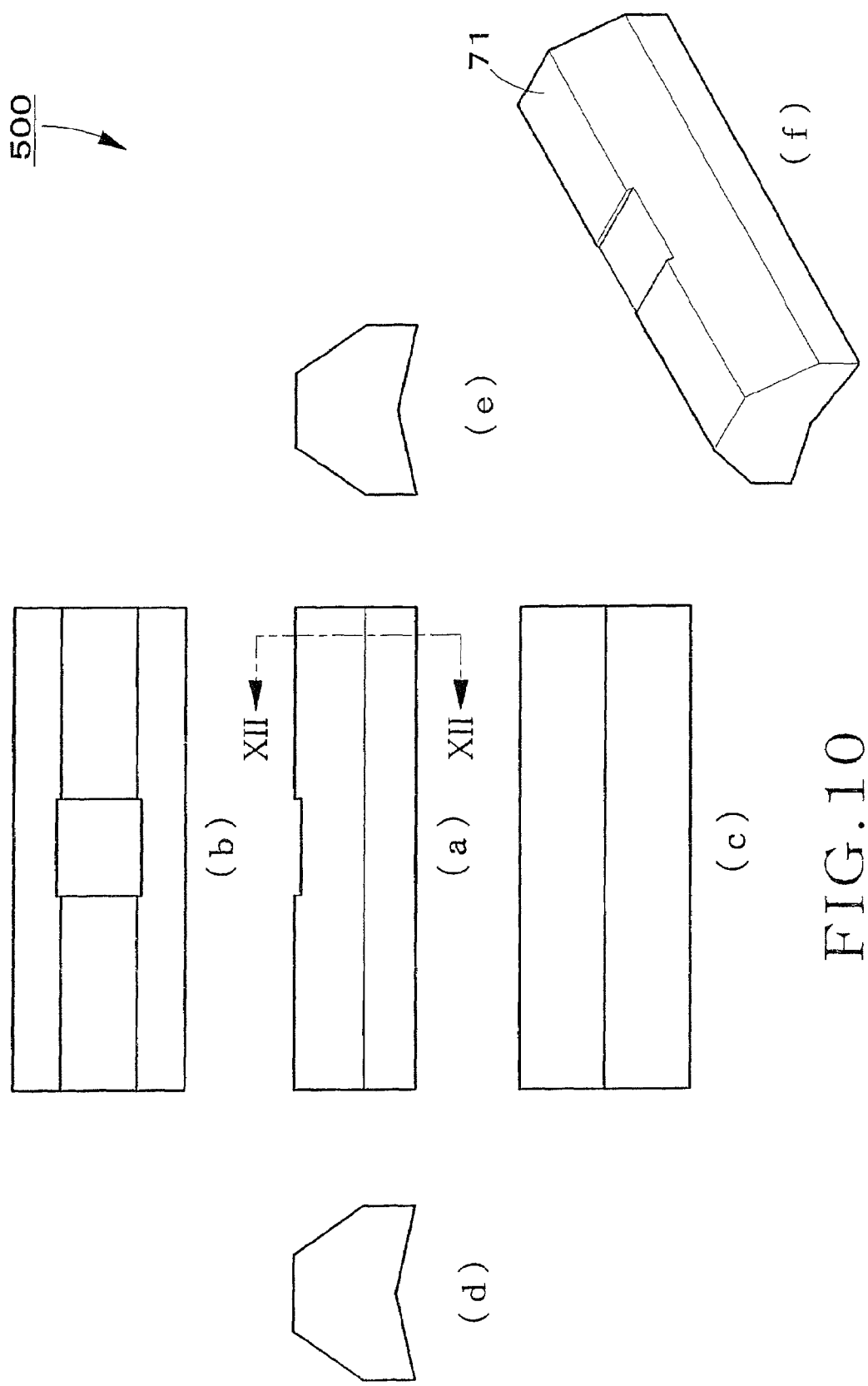
FIG. 10 is a sectional view of a material activating device in a fifth embodiment according to the present invention.

The tubular casing 71 of the material activating device 500 shown in FIGS. 10 and 12 is a tube having a trapezoidal cross section. Therefore, the material activating device 500 has a high material activating effect and can be stably installed because the material activating device 500 has a contact surface of a large area with which the material to be activated comes into contact.

The tubular casing 72 of the material activating device 510 shown in FIGS. 11 and 13 has the shape of a circular cylinder and is provided with a flat part 72a in its outside surface. The flat part 72a facilitate attaching the material activating device 510 to an object.

Figure 14:
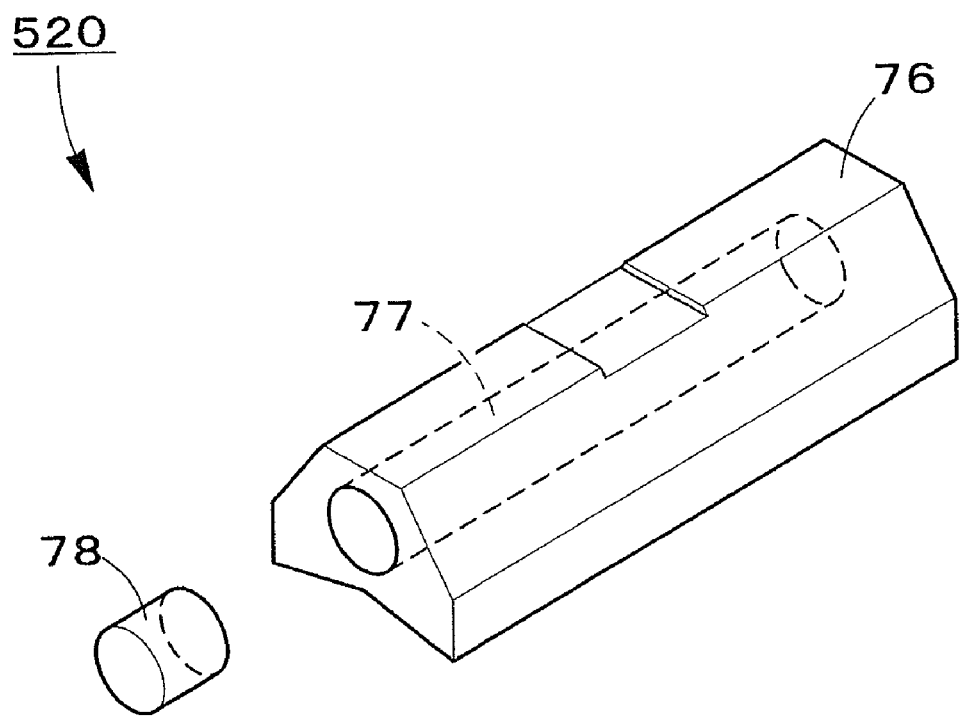
FIG. 14 is a view of a modification of the material activating device in the fifth embodiment.
Figure 15:
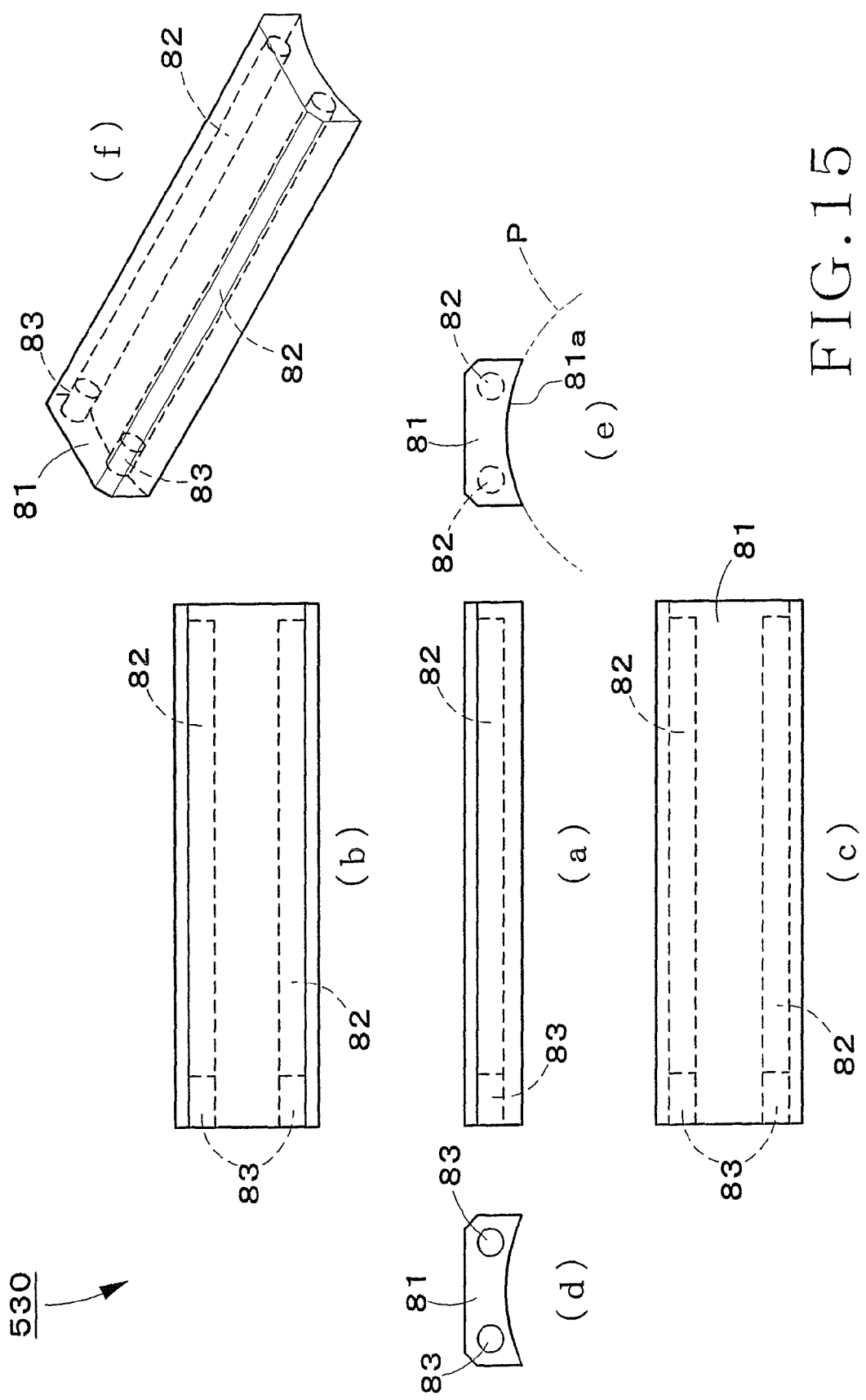
FIG. 15 is a view of a modification of the material activating device in the fifth embodiment.
Figure 16:
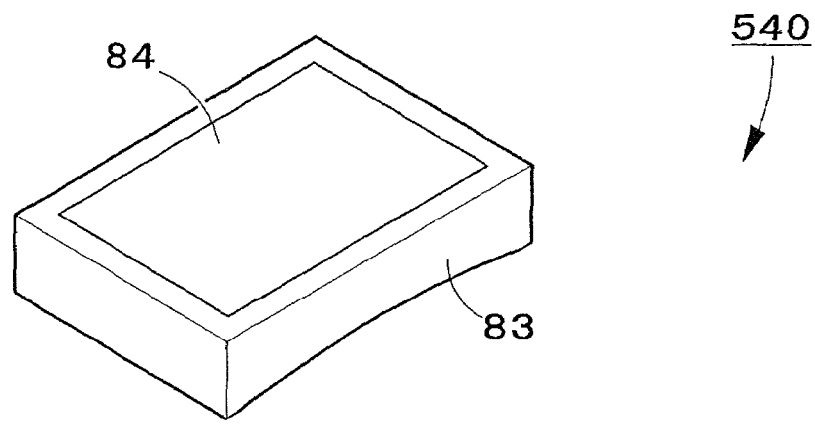
FIG. 16 is a view of a modification of the material activating device in the fifth embodiment.
Figure 16:
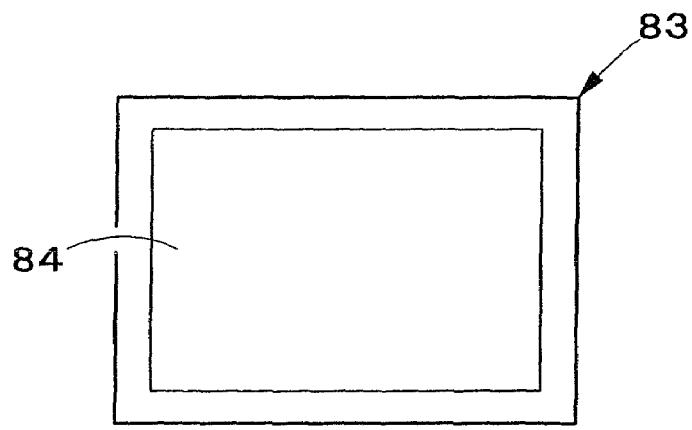
Figure 16:
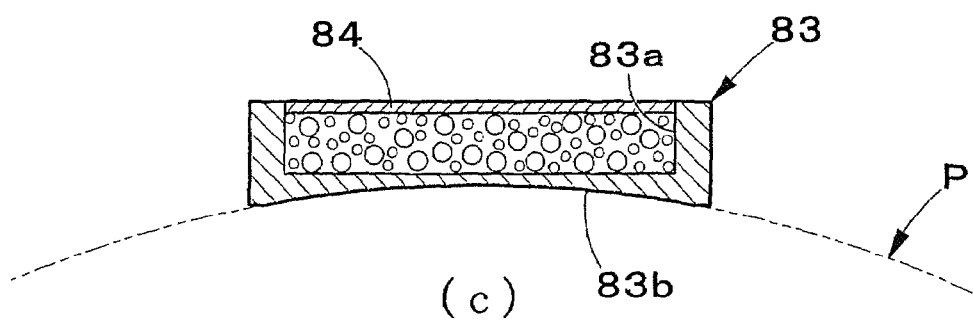

Walls of the respective casings 71 and 72 of the material activating devices 500 and 510 are thin. As shown in FIG. 14, a material activating device according to the present invention may formed by forming a cavity 77 having the shape of a circular cylinder in a solid casing 76, filling up the cavity 77 with conductive metal particles or the like, and sealing the conductive particles or the like in the cavity 77 by fitting a plug 78 in the cavity 77.

The side surface of the cavity 77 may be coated with graphite to enhance the material activating effect of the material activating device.

A material activating device 530 in a modification of the material activating device in the fifth embodiment will be described. FIGS. 15(a), 15(b), 15(c), 15(d), 15(e) and 15(f) are a front elevation, a plan view, a bottom view, a left end view, a right end view and a perspective view, respectively, of the material activating device 530. A rear view of the material activating device 530 is identical with the front elevation shown in FIG. 15(a).

The material activating device 530 has a body 81 of a conductive metal having a rectangular cross section. A surface 81a of the body 81 is formed in a concave cylindrical surface so that the body 81 can be attached to a slender pipe P in close contact with the surface of the pipe P.

The body 81 is provided with a pair of longitudinal, parallel through holes 82 having a circular cross section.

The through holes 82 are filled with a mixture of radioactive mineral particles, conductive metal particles and graphite particles. The mixture is sealed in the through holes 82 by fitting plugs 83 in the through holes 82.

The material activating device 530 can be easily attached to the surface of the pipe P carrying a material to be activated as shown in FIG. 15(e).

The optimum adjustment of the degree of activation of the material flowing through the pipe P can be achieved by properly adjusting the length of the material activating device 530.

A material activating device 540 in another modification of the material activating device in the fifth embodiment will be described with reference to FIGS. 16(a), 16(b) and 16(c).

The material activating device 540 has a rectangular, thick plate 83 made of a conductive metal and provided with a rectangular recess 83a in a surface thereof, a mixture of radioactive mineral particles, conductive metal particles and graphite particles filling up the rectangular recess 83a, and a rectangular thin plate 84 fitted in the rectangular recess 83a so as to seal the mixture in the rectangular recess 83a.

A surface 83b of the thick, thick plate 83 is formed in a concave cylindrical surface so that the rectangular, thick plate 83 can be attached to a pipe P in close contact with the surface of the pipe P.

The material activating device 540, differing from the material activating devices shown in FIGS. 10 to 15, includes the rectangular, thick plate of the conductive metal and the rectangular, thin plate.

Thus the size and the amount of the mixture filling up the recess can be optionally determined depending on the material to be activated.

The thick plate 83, the thin plate 84 and the conductive metal particles sealed in the thick plate 83 function as a conductive metal layer. Therefore, even if the pipe P is a radiator hose made of rubber and connected to the radiator of an automobile, the material activating device 540 activates a coolant flowing through the radiator hose to increase heat radiating effect.

Figure 17:
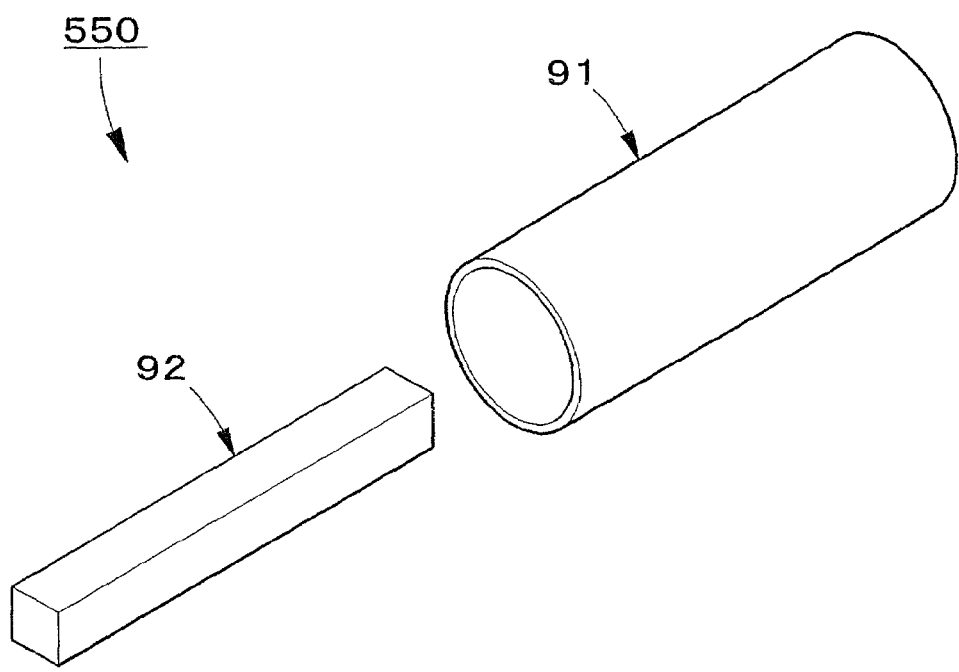
FIG. 17 is a view of a modification of the material activating device in the fifth embodiment.
Figure 18:
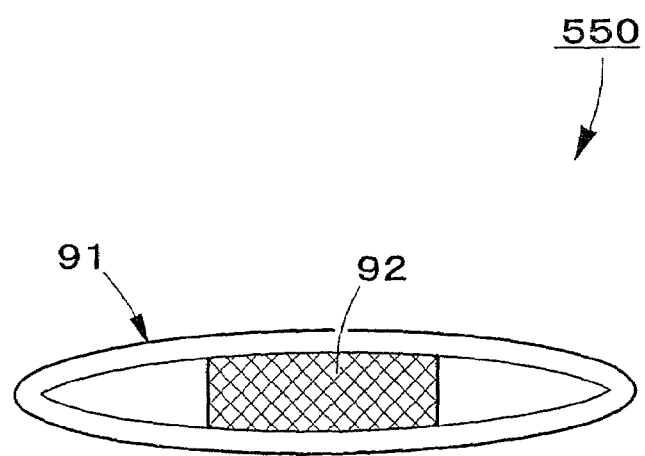
FIG. 18 is a front elevation of the material activating device shown in FIG. 17 in use.

A material activating device 550 in a third modification of the material activating device in the fifth embodiment will be described with reference to FIGS. 17 and 18.

A radioactive bar 92 is inserted in a circular tube 91 of a conductive metal or a conductive resin, the circular tube 91 is flattened, and an assembly of the flattened tube 91 and the radioactive bar 92 is cut into material activating devices 550 of a desired length.

The radioactive bar 92 is formed by preparing a mixture of conductive metal particles or fibers, graphite particles or fibers and a polymer, such as a coating material, coating a spongy holding member having the shape of a rectangular cylinder and made of rubber with a film of the mixture, and drying and solidifying the film of the mixture.

The radioactive bar 92 can be easily inserted in the circular tube 91, and the flattened assembly of the tube 91 and the radioactive bar 92 can be easily cut.

Sixth Embodiment

A material activating device 600 in a sixth embodiment according to the present invention and material activating devices in modifications of the material activating device 600 will be described with reference to FIGS. 19 to 22.

Figure 19:
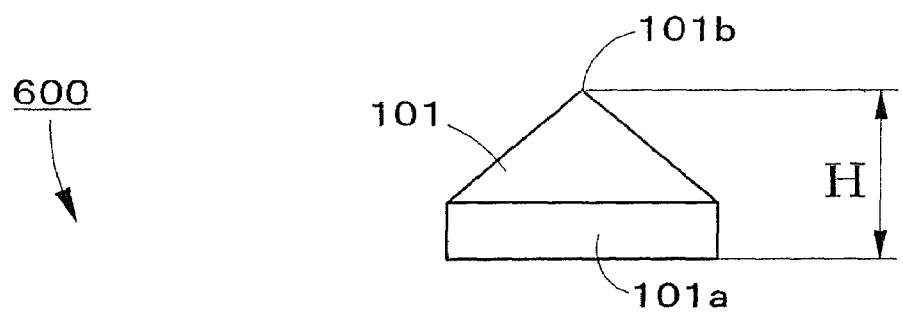
FIG. 19 is a sectional view of a material activating device in a sixth embodiment according to the present invention.
Figure 19:
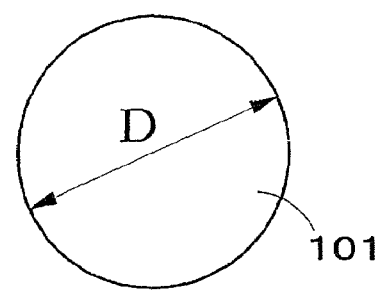
Figure 19:
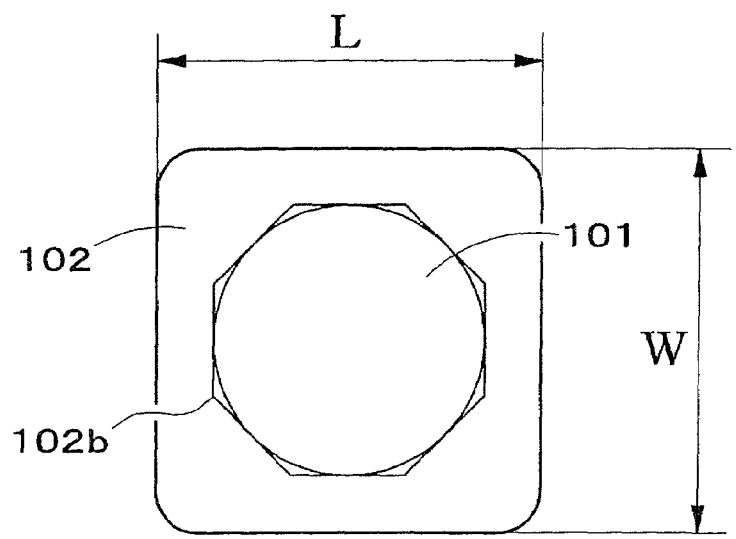
Figure 19:
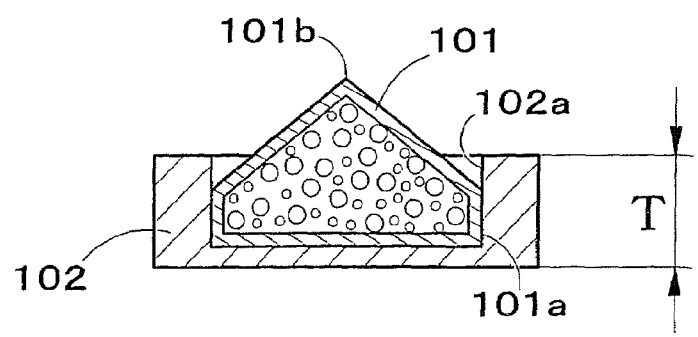

Referring to FIG. 19, the material activating device 600 includes a hollow casing 101 made of a conductive metal and having a conical part, and a flat base 102 made of a conductive metal and closely attached to the bottom surface of the hollow casing 101.

The hollow casing 101 is filled with a mixture of radioactive mineral particles, conductive metal powder and graphite powder, and the mixture is sealed in the hollow casing 101 by attaching a plug, not shown, to the hollow casing 101.

The base 102 is formed by processing a rectangular, thick plate made of a conductive metal. The base 102 is provided with an octagonal recess 102a in one surface thereof.

A cylindrical bottom part 101a of the hollow casing 101 is fitted in the recess 102a and is fixed to the base 102.

The conductive metal particles contained in the hollow casing 101, and the base 102 serve as a conductive metal layer. Thus a material to be activated can be efficiently activated.

The amount of the mixture contained in the casing 101 can be optionally determined depending on the material to be activated by adjusting the outside diameter D and the height H of the hollow casing 101. The size and the weight of the conductive metal layer can be optionally determined by adjusting the width W, the length L and the thickness T of the base 102.

The most important features of the material activating device 600 are the apex 101b of the hollow casing 101 and the corners 102b of the recess 201a formed in the base 102.

The inventors of the present invention found that the apex and the corners increase the degree of activation of the material Although further studies are necessary to explain explicitly reasons that improve the material activating effect, it is inferred that the material activating effect is enhanced because the intensities of an electric field and a magnetic field created by the charged base 102 are increased locally around the apex 101b and the corners 102b.

Figure 20:
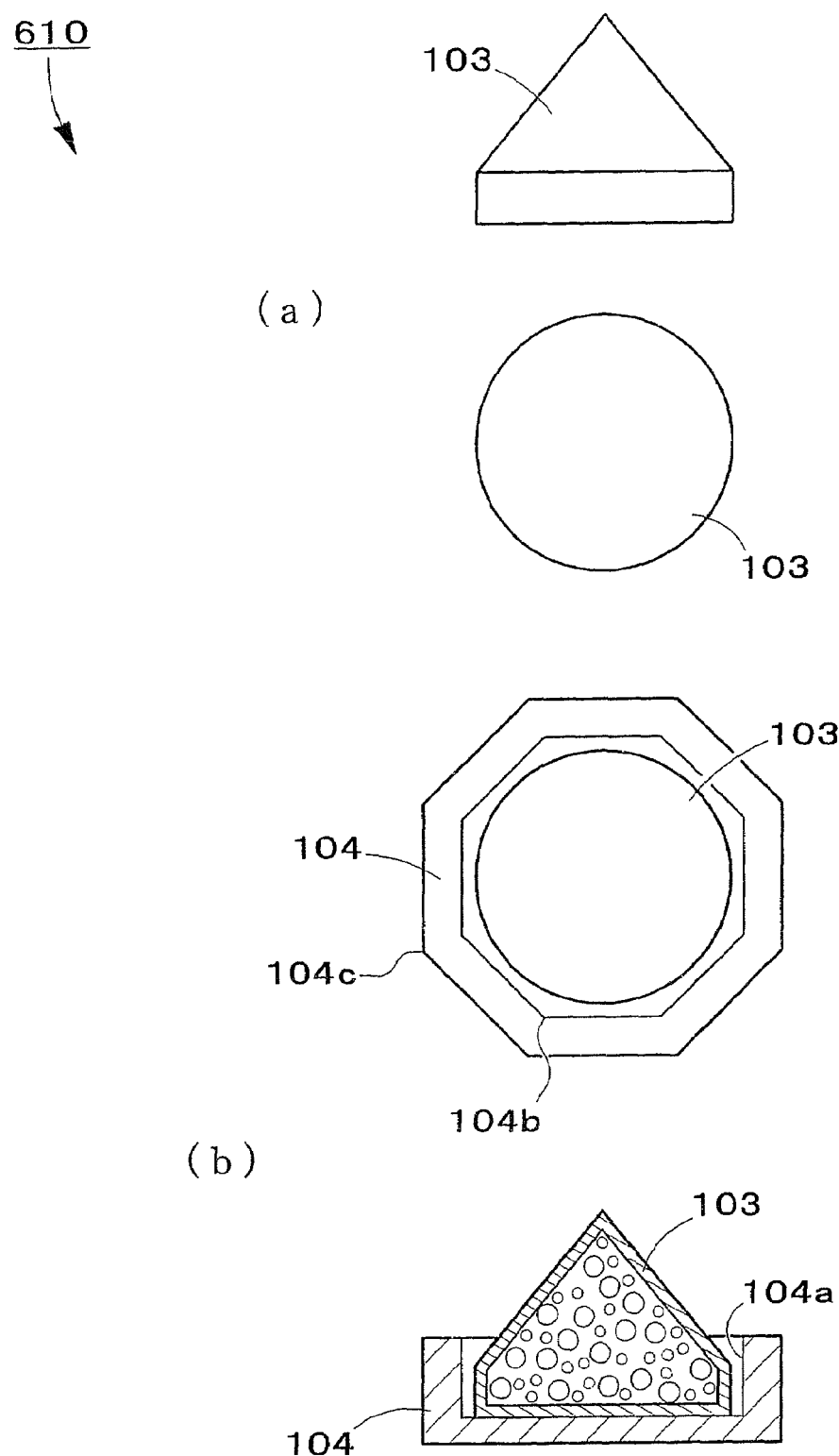
FIG. 20 is a view of a modification of the material activating device in the sixth embodiment.

A material activating device 610 shown in FIG. 20 includes a hollow casing 103 made of a conductive metal and having a conical part, and a flat base 104 made of a conductive metal and closely attached to the bottom surface of the hollow casing 103.

The hollow casing 103 is filled with a mixture of radioactive mineral particles, conductive metal powder and graphite powder, and the mixture is sealed in the hollow casing 103 by attaching a plug, not shown, to the hollow casing 101.

The base 104 is formed by processing a rectangular, thick plate made of a conductive metal. The base 104 is provided with an octagonal recess 104a in one surface thereof.

The hollow casing 104 is fixed to the base 104 with its bottom surface in close contact with the bottom surface of the recess 104a.

The material activating device 610 differs from the material activating device 600 shown in FIG. 19 greatly in that the base 104 is formed in an octagonal shape in a plane, the base 104 is provided with internal corners 104b formed in the recess 104a and external corners 104c, and the number of the corners is twice that of the corners 102b in the base 102.

Tests proved that the degree of activation of an object attained by the material activating device 610 is higher than that attained by the material activating device 600 shown in FIG. 19.

Figure 21:
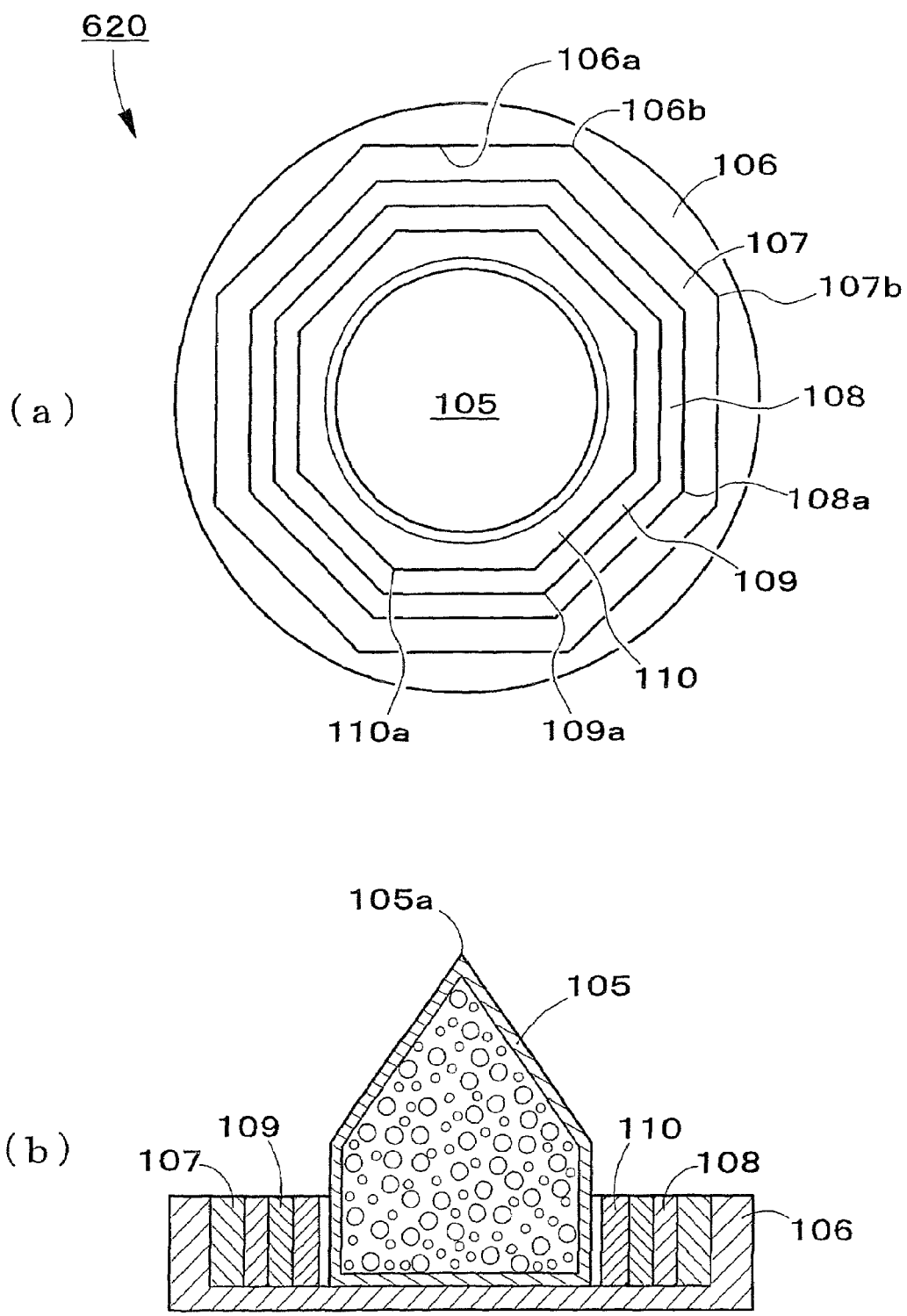
FIG. 21 is a view of a modification of the material activating device in the sixth embodiment.

A material activating device 620 shown in FIG. 21 includes a hollow casing 105 made of a conductive metal and having a conical part, and a flat base 106 made of a conductive metal and closely attached to the bottom surface of the hollow casing 105.

The hollow casing 105 is filled with a mixture of radioactive mineral particles, conductive metal powder and graphite powder, and the mixture is sealed in the hollow casing 101 by attaching a plug, not shown, to the hollow casing 105.

The base 106 is formed by processing a round, thick plate of a conductive metal. An octagonal recess 106a is formed in one surface of the round, thick plate. A structure formed by nesting octagonal annular members 107, 108, 109 and 110 is fitted in the octagonal recess 106a.

The hollow casing 105 is fitted in the innermost octagonal annular member 110 and is fixed to the base 106 with its bottom surface in close contact with the bottom surface of the recess 106a.

The material activating device 620 in the modification differs greatly from the material activating device 610 shown in FIG. 20 in that the former is provided with an increased number of corners, namely, a plurality of corners 106b formed in the recess 106a and a plurality of corners formed in the annular members 107, 108, 109 and 110.

Tests proved that the degree of activation of an object attained by the material activating device 620 is higher than that attained by the material activating device 620 shown in FIG. 20.

Test proved that the degree of activation of an object can be further increased by forming the annular members 107, 108, 109 and 110 of different conductive metals, such as aluminum, copper, brass and the like.

It is proved that the degree of activation of an object can be further increased by selectively determining metals for forming the annular members 107, 108, 109 and 110 taking into consideration the properties of a material forming the object to be activated.

The degree of activation of a material that can be attained by the material activating devices 600, 610 and 620 in the sixth embodiment can be further increased by forming an apex in the hollow casing and forming corners in the base.

Figure 22:
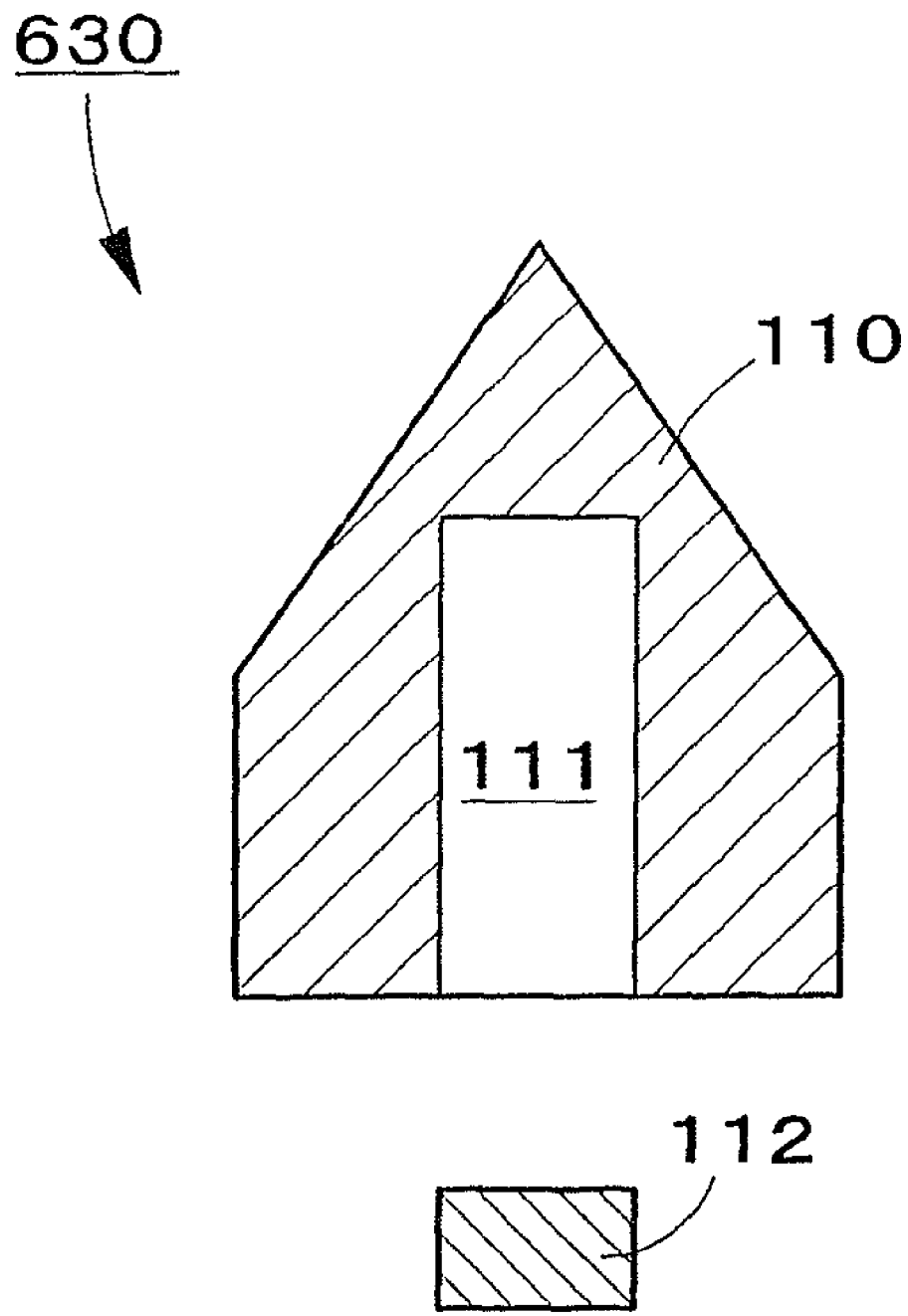
FIG. 22 is a view of a modification of the material activating device in the sixth embodiment.

Each of the casings 101, 103 and 105 of the material activating devices 600, 610 and 620 in the sixth embodiment has thin walls. As shown in FIG. 22, a material activating device 630 in a modification may include a substantially conical, solid casing 110 provided with a cylindrical cavity 111, conductive metal particles filling up the cavity 111, and a plug 112 fitted in the cavity 111 to seal the conductive metal particles in the cavity 111.

The size of the cavity 111 can be changed so that the cavity 111 is suitable for a material forming an object to be activated. Material activating effect can be enhanced by coating the side surface of the cavity 111 with a graphite coating.

Seventh Embodiment

A material activating device 700 in a seventh embodiment according to the present invention and a material activating device 710 in a modification of the former will be described with reference to FIGS. 23 and 24.

Figure 23:
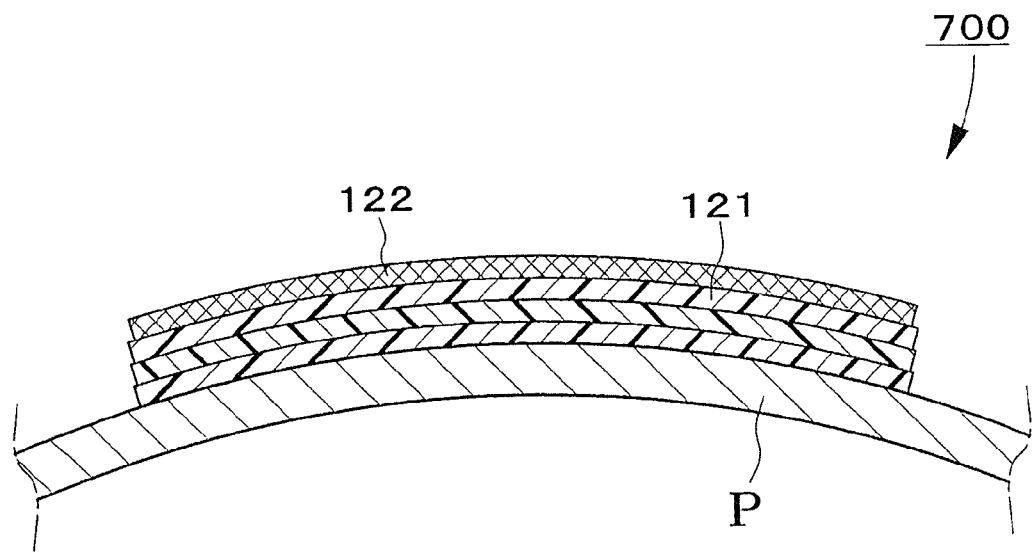
FIG. 23 is a sectional view of a material activating device in a seventh embodiment according to the present invention.

Referring to FIG. 23, the material activating device 700 includes a laminated structure formed by superposing three rectangular thin plates 121 made of a conductive polymer, such as polyacene or polypyrrole, and a radioactive layer 122 attached closely to one of the surfaces of the laminated structure.

The material activating device 700 is attached to the surface of a resin pipe P carrying a material to be activated with, for example, an adhesive tape.

The thin plates 121 made of the conductive polymer of the material activating device 700 in the seventh embodiment is highly flexible. Therefore, the material activating device 700 can be bent and can be easily attached to the curved surface of a rubber pipe P.

Since the thin plates 121 can be easily cut with scissors or a cutter, the shape and the size of the material activating device 700 can be easily adjusted so as to be suitable for the size of an object to which the material activating device 700 is to be attached.

The thin plates 121 made of the conductive polymer exercise the same effect as a conductive metal plate and activates a material flowing through the pipe P efficiently.

Figure 24:
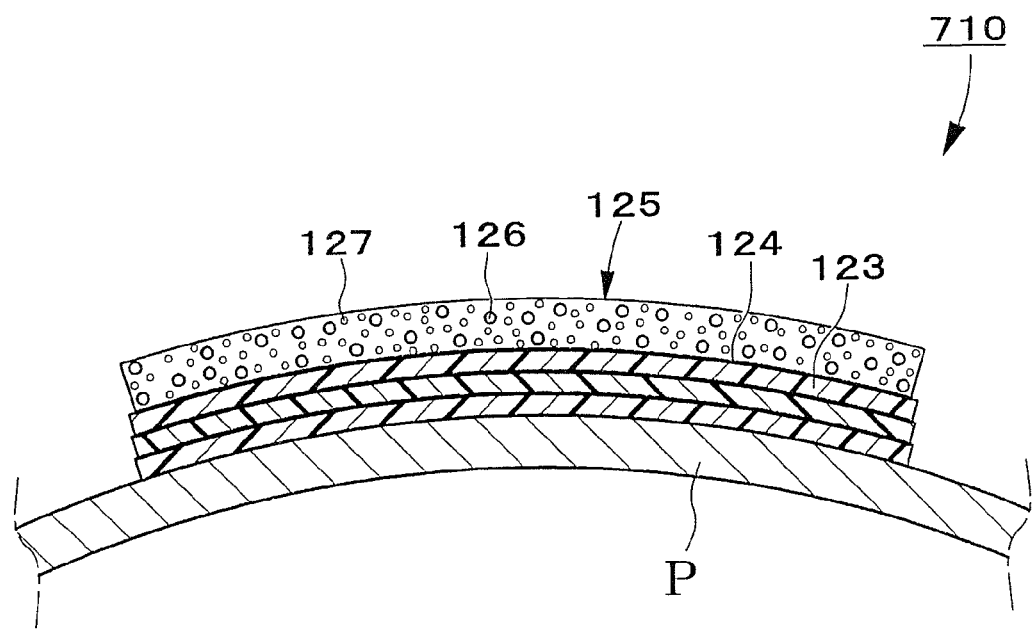
FIG. 24 is a sectional view of a modification of the material activating device in the seventh embodiment.

Referring to FIG. 24, the material activating device 710 includes a laminated structure formed by superposing three rectangular thin plates 123 made of a conductive polymer, such as polyacene or polypyrrole, and each having a surface coated with a conductive metal thin film 124 formed by sputtering, and a radioactive layer 125 attached closely to one of the surfaces of the laminated structure.

The radioactive layer 125 is formed by spreading a mixture of monazite particles that emit weak radioactive rays, conductive metal particles 126 or conductive metal fibers 126, graphite particles 127 or graphite fibers 127 and a polymer, such as a coating material, in a film and solidifying the polymer.

The conductivity of the thin plates 123 made of the conductive polymer and each having the surface coated with the conductive metal thin film 124 of the material activating device 710 is higher than that of the thin plates 121 of the material activating device 700.

The conductivity can be adjusted so as to be suitable for an object to be activated and the object can be activated at an optimum degree of activation.

An insulating film made of an electrically insulating material may be interposed between the adjacent ones of the thin plates 121 and 123 made of the conductive polymer.

The radioactive layer can be formed by printing a mixture of radioactive mineral particles, particles or fibers of a conductive metal and graphite, and a printing ink on the surface of the thin plate 121 of the conductive polymer or the surface of the thin film 124 of the conductive metal formed on the surface of the thin plate 123 of the conductive polymer by silk-screen printing.

Eighth Embodiment

Figure 25:
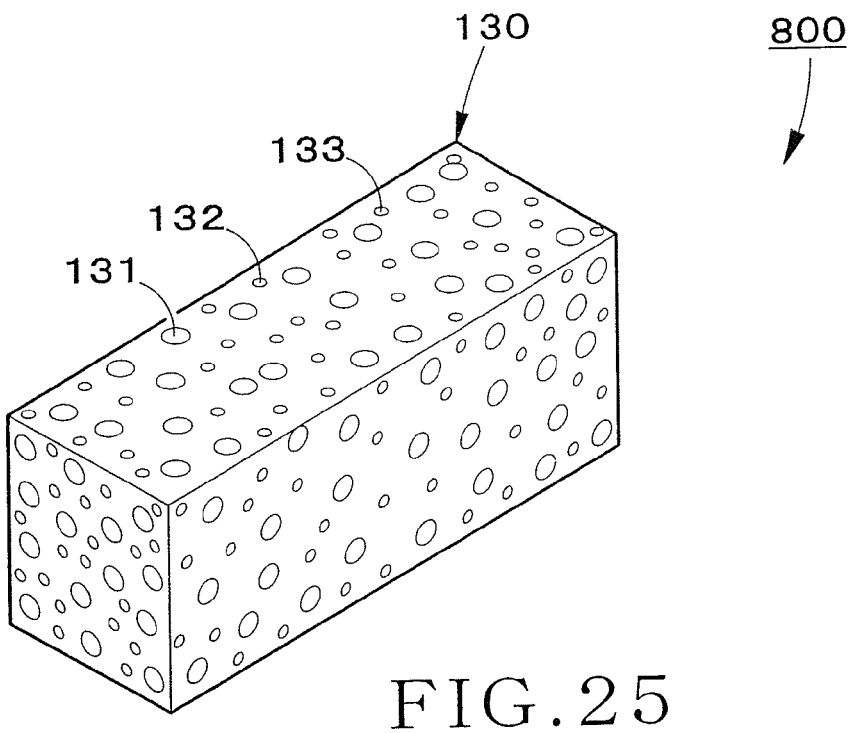
FIG. 25 is a perspective view of a material activating device in an eighth embodiment according to the present invention.

A material activating device 800 in an eighth embodiment according to the present invention will be described with reference to FIGS. 25 and 26.

The material activating device 800 includes a material activating block (radioactive means) 130 formed by molding an oxide or nitride ceramic material. The oxide or nitride ceramic material is prepared by mixing radioactive mineral particles 131, such as particles of monazite, phosphorous ore, titanium ore, bastonäsite, zircon or samarium, particles 132 or fibers 132 of a conductive metal and graphite particles 133 or graphite fibers 133.

The material activating device 800 in the eighth embodiment is not provided with any layer corresponding to the conductive metal layers of the foregoing two patented material activating devices.

The material activating device 800 is developed on the basis of a newly acquired knowledge that a device provided with a member containing both radioactive mineral particles and conductive metal particles or fibers and not provided with any conductive metal layer is equivalent with a material activating device provided with a conductive metal layer in material activating effect.

Thus the material activating device 800 in the eighth embodiment can be used for material activation in a corrosive environment in which the foregoing two patented material activating devices cannot be used because the conductive metal layers thereof are subject to corrosion.

The material activating block 130 may be attached to a wall of an object holding a material to be activated therein by using, for example, a bracket, a metal or resin fastening band or bolts or can be attached or adhesively bonded to a surface of the wall of the object with an adhesive tape or an adhesive.

Since the material activating block 130 is a ceramic block, the material activating block 130 is excellent in heat resistance and corrosion resistance. Thus the material activating block 130 is suitable for activating a material in a special environment, such a corrosive environment or a hot environment.

When the material activating block 130 is attached to the outside surface of an object, weak radioactive rays emitted by the radioactive mineral particles 131 dispersed in the material activating block 130 ionize the object to be activated.

At the same time, the conductive metal particles 132 are charged with electric charges produce by ionization and create an electric field and a magnetic field. The electric and the magnetic field thus created act on the ionized material to promote the ionization of the material.

The graphite particles 133 dispersed in the material activating block 130 reduce work function on the surfaces of conductive metal particles 132 and thereby the degree of activation of the material is further increased.

The proportions, particle sizes or fiber lengths of the radioactive mineral particles 131, the conductive metal particles 132 or fibers 132 and the graphite particles 133 or fibers 133 dispersed in the material activating block 130 may be properly determines so as to be suitable for the type of the material to be activated and a desired degree of activation of the material.

Figure 26:
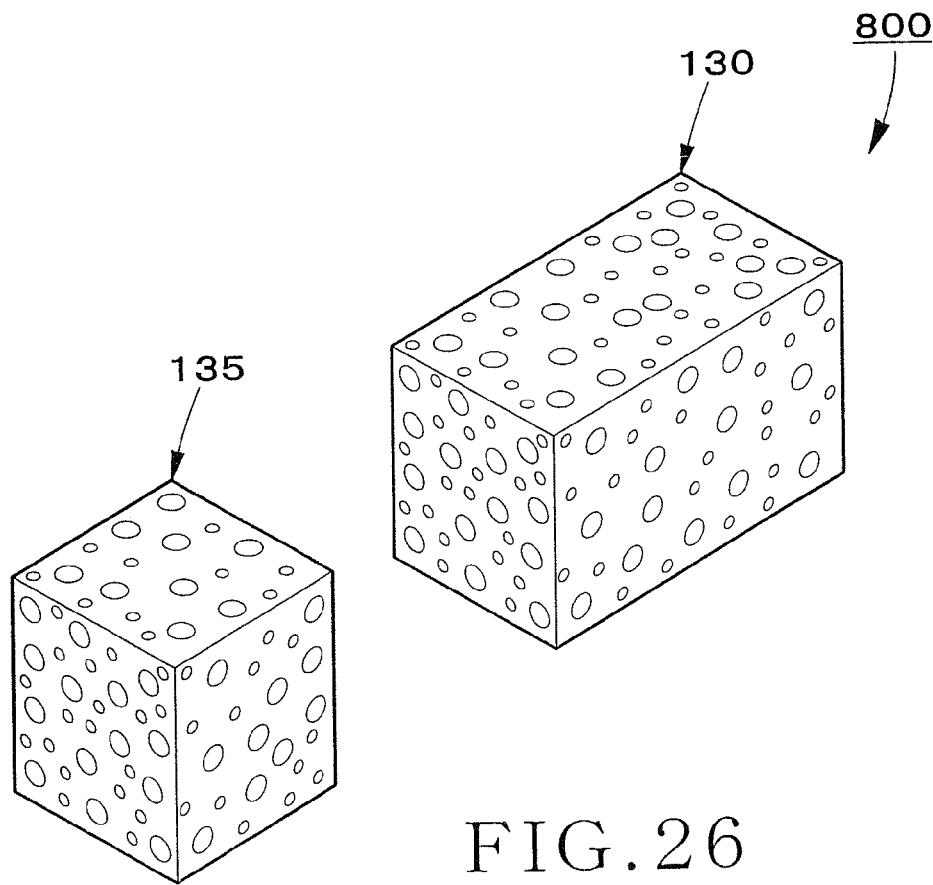
FIG. 26 is a perspective view of pieces formed by dividing the material activating device shown in FIG. 25.

The material activating block 130 formed in a long rectangular solid may be cut to obtain a material activating block 135 of a desired size as shown in FIG. 26.

Figure 27:
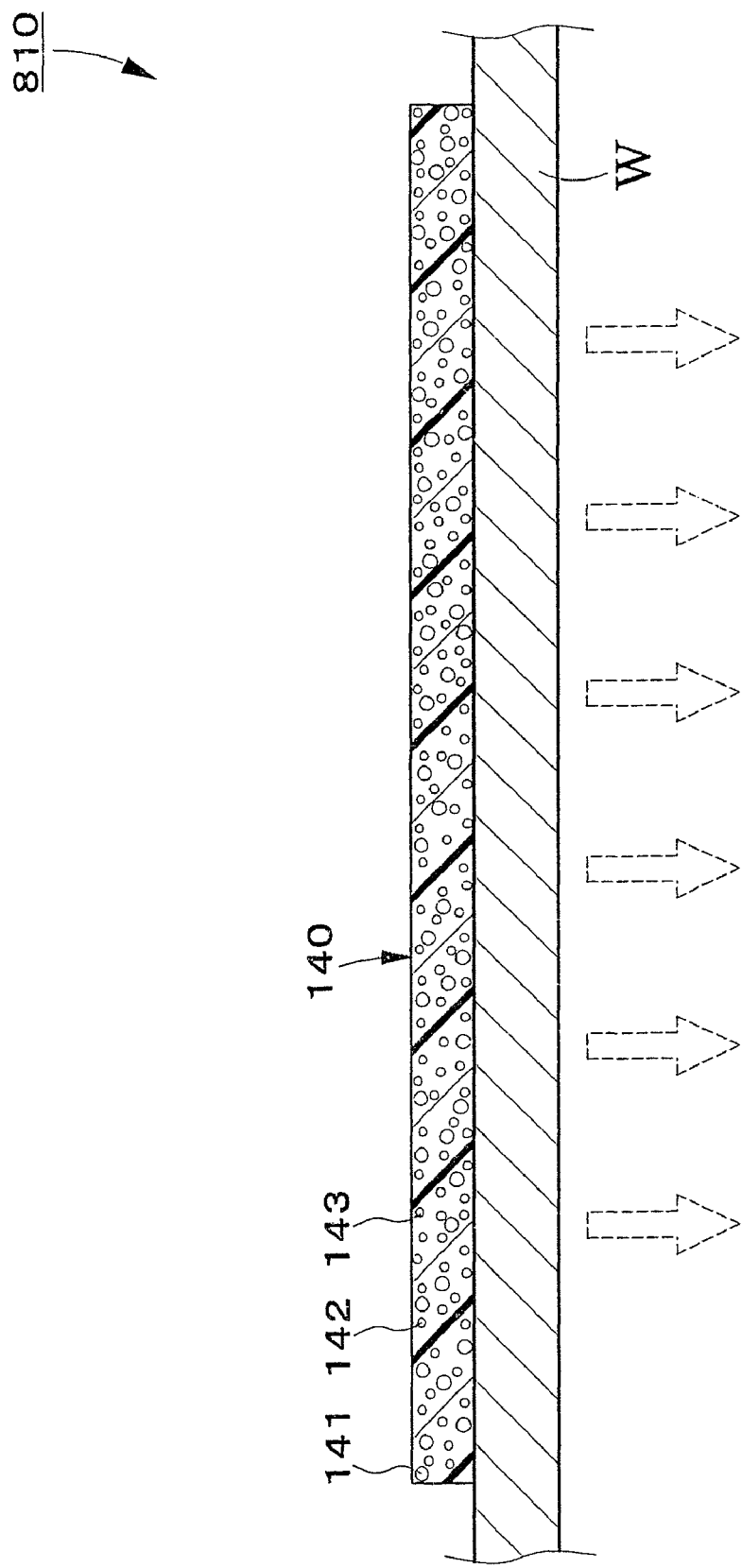
FIG. 27 is a sectional view of a modification of the material activating device in the eighth embodiment.

A material activating device 810 in a modification of the material activating device 800 in the eighth embodiment will be described with reference to FIG. 27.

The material activating device 810 has a material activating film 140 formed by applying a coating mixture prepared by mixing a coating polymer, radioactive mineral particles 141 that emit radioactive rays for irradiating a material to be activated, conductive metal particles 142 or fibers 142 and graphite particles 143 or fibers 143 in a film to the outside surface of a wall W having an inside surface contiguous with the material to be activated, and drying and setting the mixture on the outside surface of the wall W. The material activating film 140 is bonded to the outside surface of the wall W.

When the material activating film 140 is thus formed and bonded to the outside surface of the wall W by applying the coating mixture to the outside surface of the wall W in a film and drying and setting the film, weak radioactive rays emitted by the radioactive mineral particles 141 ionize the material contiguous with the inside surface of the wall W.

At the same time, the conductive metal particles 142 are charged with electric charges produce by ionization and create an electric field and a magnetic field. The electric and the magnetic field thus created act on the ionized material to promote the ionization of the material greatly.

The graphite particles 143 dispersed in the material activating film 140 reduce work function on the surfaces of conductive metal particles 142 and thereby the degree of activation of the material is further increased.

The material activating film 140 can be easily formed on a surface of a very large area having a complicated shape, such as the inside surface of a lower part of the fiber glass reinforced plastic hull of a boat. Thus the material activating film 140 can be used for activating materials in various fields in which the known material activating devices could not have been used.

The proportions, particle sizes or fiber lengths of the polymer, the radioactive mineral particles 141, the conductive metal particles 142 or fibers 142 and graphite particles 143 or fibers 143 may be properly determines so as to be suitable for the type of the material to be activated and a desired degree of activation of the material.

Ninth Embodiment

Figure 28:
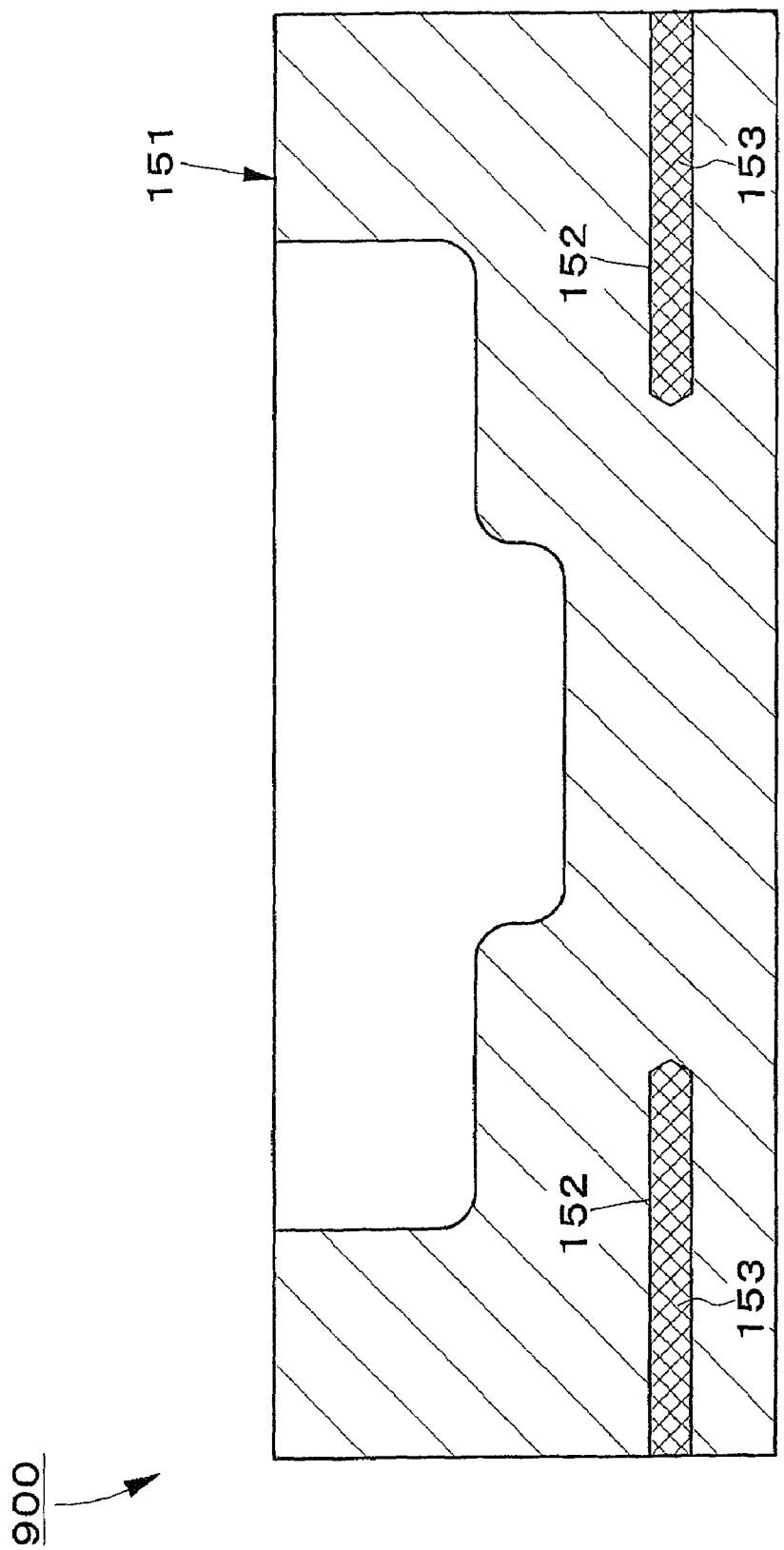
FIG. 28 is a sectional view of a material activating device in a ninth embodiment according to the present invention.

A material activating device 900 in a ninth embodiment according to the present invention will be described with reference to FIG. 28.

The material activating device 900 in the ninth embodiment is formed by filling up bottomed holes 152 formed in a forming die 151 made of a conductive metal with radioactive members 153.

The radioactive members 153 contain a mixture of particles of a radioactive mineral, particles or fibers of a conductive metal, graphite particles or fibers. The radioactive mineral is, for example, monazite, phosphorous ore, titanium ore, bastonäsite, zircon or samarium.

Each of the radioactive material 153 may be formed in a solid member by mixing the mixture into a polymer and solidifying the polymer containing the mixture, in a liquid by mixing the mixture in a fluid, such as an oil having a high viscosity or in a coating member by applying the mixture in a film to a holding member of a polymer or a conductive metal, and drying and setting the film to facilitate filling up the bottomed holes 152 with the radioactive members 153.

Weak radioactive rays emitted by the radioactive mineral particles contained in the radioactive member 153 filled and sealed in the bottomed holes 152 charge the forming die 151.

At the same time, the conductive metal particles or fibers are charged with electric charges and create an electric field and a magnetic field.

The graphite particles contained in the radioactive member 153 reduce work function on the surfaces of conductive metal particles or the surface of the forming die and activate the forming die.

Consequently, the quality of the surfaces of products formed by using the forming die is improved.

The material activating device in the ninth embodiment is not limited to the forming die.

For example, the material activating device can be embodied in beds, tables, spindles and headstocks of machine tools, such as lathes and machining centers, screw cylinders of injection molding machines and heads and dies of blow molding machines.

The material activating device in the ninth embodiment can be embodied in lubricating devices for lubricating cutting tools on machine tools and mold releasing agent spraying devices for spraying mold releasing agents.

The material activating device improves the lubricating and cooling effects of lubricants and cooling liquids and the mold releasing effect of mold releasing agents in addition to the improvement of the surface condition and the damping effect of the object and the improvement of the accuracy of the shape and surface roughness of workpieces.

When the material activating device in the ninth embodiment is attached to battery cables connected to the terminals of a lead-acid battery, lead sulfate crystals deposited on the electrodes due to sulfation can be decomposed and thereby the original ability of the lead-acid battery deteriorated by sulfation can be recovered.

The radioactive material containing the radioactive mineral particles, conductive metal particles or fibers and graphite particles or fibers is capable of supplying electrons to an object to be activated.

The battery cable connected to the terminal of the lead-acid battery is formed by coating a conductive cable for carrying a current with an insulating coating.

When the radioactive member is attached to a part of the battery cable near the terminal of the lead-acid battery, the radioactive member, the conductive cable and the insulating coating form a structure equivalent to a capacitor.

Electrons accumulated in the capacitor is continuously supplied to the electrodes of the lead-acid battery during discharge and dark discharge. Consequently, the electrons prevent the deposition of lead sulfate on the electrodes and promotes the decomposition of lead sulfate deposited on the electrodes. Thus the original ability of the lead-acid battery deteriorated by sulfation can be recovered.

The lead sulfate deposited on the electrodes is decomposed into lead ions and sulfate ions and dissolves in the electrolyte and hence fine lead sulfate particles are not deposited in the electrolyte.

This lead sulfate removing method differs from a conventional lead sulfate removing method in that the former does not cause problems including damaging the electrode grids, causing the lead oxide to fall off the electrode grids and making the electrolyte turbid with lead sulfate particles.

When the lead-acid battery is charged, lead ions return to the electrode grids and the electrode grids restore their spongy surfaces, sulfate ions contained in the electrolyte increase to increase the sulfuric acid concentration of the electrolyte. Consequently, the lead-acid battery can be recovered to its full capacity.

Since the reduction of charging efficiency due to the nonconductive lead sulfate deposited on the electrodes can be made up, load on the alternator decreases and, consequently, driving torque increases.

The material activating device in the ninth embodiment can be attached to the terminal of the lead-acid battery with an insulator of, for example, rubber held between the terminal and the material activating device for the same effect.

A spark produced by the spark plug of an automotive engine can be intensified by attaching the material activating device in the ninth embodiment to a secondary cable connected to the spark plug.

The radioactive member containing the radioactive mineral particles, conductive metal particles or fibers and graphite particles or fibers is capable of supplying electrons to an object to be activated.

The secondary cable connected to the spark plug is formed by coating a conductive cable for carrying a current with an insulating coating When the radioactive member is attached to a part of the secondary cable near the spark plug, the radioactive member, the conductive cable and the insulating coating form a structure equivalent to a capacitor.

Electrons are supplied to the secondary cable during a period excluding ignition times and the electrons accumulated in the secondary cable flow into the spark plug at an ignition time. Consequently, the ignition spark is intensified.

When the conductive cable of the secondary cable activated by the agency of the material activating member is excited, the electrical resistance of the conductive cable decreases. Consequently, loss of ignition power can be reduced and stable, high ignition power for producing an intense spark can be supplied to the spark plug.

Although the invention has been described in terms of the material activating devices in the preferred embodiments, the present invention is not limited in its practical application to those specifically described herein and many changes and variations may be made therein without departing from the scope and spirit thereof.

For example, the material activating devices in the first to the third embodiment may employ a radioactive layer not containing particles or fibers of a conductive metal and graphite.

The invention claimed is:

1. A material activating device comprising: a radioactive layer of a radioactive means that emits radioactive rays for irradiating a material to be activated; and a conductive metal layer disposed on one side of the radioactive layer of the radioactive means so as to be interposed between the radioactive layer of the radioactive means and the material to be activated;
   wherein the conductive metal layer is formed by holding conductive metal particles or fibers by a holding means.

2. The material activating device according to claim 1, wherein the holding means is a polymer layer containing the conductive metal particles or fibers dispersed therein.

3. The material activating device according to claim 1, wherein the holding means is a fiber structure containing the conductive metal particles or fibers dispersed therein.

4. The material activating device according to claim 1, wherein the holding means is a woven fiber structure containing conductive metal fibers.

* * * * *